United States Patent
Kreishan et al.

(10) Patent No.: US 10,757,535 B1
(45) Date of Patent: Aug. 25, 2020

(54) METHODS AND APPARATUS FOR MAINTAINING AND USING GEOLOCATION DATA IN A WIRELESS SYSTEM

(71) Applicant: Charter Communications Operating, LLC, St. Louis, MO (US)

(72) Inventors: Loay Kreishan, Aurora, CO (US); Akram Hassanien, Plano, TX (US); Hossam Hmimy, Aurora, CO (US); William K. Logan, Overland Park, KS (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/556,787

(22) Filed: Aug. 30, 2019

(51) Int. Cl.
*H04W 4/021* (2018.01)
*H04W 72/04* (2009.01)
*H04W 28/16* (2009.01)
*H04W 48/16* (2009.01)
*H04L 29/08* (2006.01)

(52) U.S. Cl.
CPC ........... *H04W 4/021* (2013.01); *H04L 67/125* (2013.01); *H04W 28/16* (2013.01); *H04W 48/16* (2013.01); *H04W 72/048* (2013.01); *H04W 72/0473* (2013.01)

(58) Field of Classification Search
CPC .............. H04W 4/021; H04W 72/048; H04W 72/0473; H04W 28/16; H04W 48/16; H04L 67/125
See application file for complete search history.

(56) References Cited

U.S. PATENT DOCUMENTS

| | | | |
|---|---|---|---|
| 8,649,791 B1* | 2/2014 | Wohld | H04W 36/00835 455/446 |
| 10,368,351 B1* | 7/2019 | Syed | H04W 72/048 |
| 2004/0229629 A1* | 11/2004 | Yi | H04L 12/189 455/452.2 |
| 2010/0159927 A1* | 6/2010 | Toda | H04W 48/16 455/435.2 |
| 2012/0106516 A1* | 5/2012 | Jung | H04W 48/08 370/331 |
| 2015/0304913 A1* | 10/2015 | Uusitalo | H04W 36/02 455/444 |
| 2017/0195887 A1* | 7/2017 | Jovancevic | H04W 72/0446 |
| 2018/0049140 A1* | 2/2018 | Hirsbrunner | H04W 48/02 |

(Continued)

*Primary Examiner* — Brandon J Miller
(74) *Attorney, Agent, or Firm* — Straub & Straub; Michael P. Straub; Stephen T. Straub

(57) ABSTRACT

A user device includes and maintains a geolocation list (GLL) including sets of information corresponding to Citizens Broadband radio Services Devices (CBSDs). The GLL stored in the user device contains entries corresponding to the areas most recently visited by the UE, each entry including location information of a CBSD. User devices typically frequent a limited set of the same areas repetitively. Thus this maintained relatively small list provides the UE with a highly relevant set of information which can be quickly accessed without additional wireless signaling and the additional power loss associated with a typical search. When the UE desires to find and connect to a CBSD, the UE first searches its GLL for a CBSD providing coverage in its currently located area. However, if GLL search does not identify a CBSD, then the UE sends a request to a geolocation server for active CBSDs.

18 Claims, 20 Drawing Sheets

(56) References Cited

U.S. PATENT DOCUMENTS

2019/0058999 A1* 2/2019 Gunasekara ...... H04W 36/0022
2019/0191470 A1* 6/2019 Joseph .................. H04W 76/11
2019/0222339 A1* 7/2019 Badic ................... H04B 17/336

* cited by examiner

| FIGURE 2A |
| FIGURE 2B |
| FIGURE 2C |
| FIGURE 2D |

FIGURE 4

400 — GEOLOCATION LIST (INCLUDED IN A USER EQUIPMENT (UE) DEVICE)

| 402 TABLE INDEX NUMBER | 404 TIME STAMP, E.G., POSIX TIME OR EPOCH TIME FOR STORING ENTRY | 406 CBSD ID, E.G., SYSTEM WIDE UNIQUE IDENTIFIER FOR REGISTERED CBSD | 408 CBSD CHANNEL LIST (LIST OF CHANNELS USED BY CBSD) | 410 CBSD EIRP (AUTHORIZED EIRP LEVELS PROVIDED BY SAS) | 412 COVERAGE RADIUS, E.G., BASED ON EIRP AND PROVIDED BY GEOLOCATION SERVER, E.G., A CALCULATED AVERAGE COVERAGE DISTANCE FOR CBSD | 414 CBSD LONGITUDE (THE LONGITUDE LOCATION COORDINATES OF THE CBSD) | 416 CBSD LATITUDE (THE LATITUDE LOCATION COORDINATES OF THE CBSD) | 418 CBSD AGL (THE ALTITUDE LOCATION COORDINATES OF THE CBSD ABOVE GROUND LEVEL) | 420 CBSD OWNER (THE NAME OR ID OF THE CBSD OPERATOR) |
|---|---|---|---|---|---|---|---|---|---|
| 1 (422→424) | $V_{TS1}$ | $V_{CBSDID1}$ | {CH SET 1} | $V_{EIRP1}$ | $V_{CR1}$ | $V_{LAT1}$ | $V_{LON1}$ | $V_{ALT1}$ | $V_{IDSP1}$ |
| 2 (426) | $V_{TS2}$ | $V_{CBSDID2}$ | {CH SET 2} | $V_{EIRP2}$ | $V_{CR2}$ | $V_{LAT2}$ | $V_{LON2}$ | $V_{ALT2}$ | $V_{IDSP1}$ |
| 3 (428) | $V_{TS3}$ | $V_{CBSDID3}$ | {CH SET 3} | $V_{EIRP3}$ | $V_{CR3}$ | $V_{LAT3}$ | $V_{LON3}$ | $V_{ALT3}$ | $V_{IDSP1}$ |
| ... | | | | | | | | | |
| N, E.G., WHERE $100 \leq N \leq 200$ (430) | $V_{TSN}$ | $V_{CBSDIDN}$ | {CH SET N} | $V_{EIRPN}$ | $V_{CRN}$ | $V_{LATN}$ | $V_{LONN}$ | $V_{ALTN}$ | $V_{IDSP2}$ |

METHODS AND APPARATUS FOR MAINTAINING AND USING GEOLOCATION DATA IN A WIRELESS SYSTEM

FIELD

The present application relates to communications methods and apparatus, and more particularly, to maintaining geolocation data in user devices to support efficient communications, e.g., with Citizens Broadband radio Services Devices (CBSDs).

BACKGROUND

User Equipment devices (UEs) often implement a scanning procedure to determine if there is wireless coverage at the UE's location. A scanning interval used by the UE to control how frequently to scan will typically increase with time if the UE device is not able to find the required network. Some configurations will make the largest scanning interval to be 15 minutes. In some systems a UE device will scan regardless of the geographical location. This will cost the device resources particularly power since power is required to implement a scan.

Based on the above discussion, there is a need for new methods and apparatus for a user device to efficiently find a wireless base station to which the user device may connect.

In view of the above it should be appreciated that there is a need for improved methods and/or apparatus that can facilitate power efficient UE discovery of one or more base stations.

SUMMARY

A user device includes and maintains a geolocation list (GLL) including sets of information corresponding to Citizens Broadband radio Services Devices (CBSDs). The GLL stored in the user device is of limited size, typically much smaller than a CBSD list maintained by a geolocation server's database corresponding to a service provider. The GLL stored in the user device includes entries corresponding to the areas most recently visited by the UE, each entry corresponding to a CBSD and including a set of CBSD information including location information, e.g., latitude and longitude coordinates, of the CBSD. In some embodiments, each entry includes an entry storage time tag, and the limited size GLL uses a first in first out (FIFO) buffering scheme for storage. User devices typically frequent a limited set of the same areas repetitively. Thus this maintained relatively small list (GLL) provides the UE with a highly relevant set of information which can be quickly accessed without additional wireless signaling and/or without the additional power loss associated with a typical search to find a CBSD device.

When the UE desires to find and connect to a CBSD, the UE first searches its GLL for a CBSD providing coverage in its currently located area, and then attempts to connect with the identified CBSD from its GLL. However, if the UE does not find a CBSD in its GLL providing coverage at its current location, then the UE sends a request to a geolocation server for active CBSDs in its current area of interest. The geolocation server searches its geolocation database, generates and sends a response to the UE. In some embodiments, the response includes a search results code value and one or more sets of information corresponding to CBSDs. For example, in some embodiments, the search results code value is one of: i) "1" indicating an active CBSD has been found in the area of interest, ii) "0" indicating that there are one or more currently inactive CBSDs in the area of interest but no currently active CBSDs in the area of interest, or iii) "NULL" indicating that there are not any active or inactive CBSDs in the area of interest. The one or more sets of information corresponding to CBSDs, in some embodiments, includes either: i) a set of information corresponding to the closest active CBSD which can provide coverage in the area of interest or ii) N, e.g., where N=4, sets of information corresponding to the N closest active CBSDs, which provide coverage outside the area of interest. The received sets of CBSD information are stored in the UE's GLL, e.g., to be available to be used at the present time or in the future during a subsequent search for an active CBSD.

An exemplary method of operating a user equipment (UE) device, in accordance with some embodiments, comprises: storing, in memory included in the UE device, a coverage area search radius to be used in searching for a base station which can be used by said UE to obtain wireless connectivity to a network; sending a request for base station information to a server; and receiving a response message in response to the request for base station information, said response message including a code value indicating at least whether or not there is at least one CBSD providing coverage to the current location of the UE device. An exemplary user equipment (UE) device, in accordance with some embodiments, comprises: memory storing a coverage area search radius to be used in searching for a base station which can be used by said UE to obtain wireless connectivity to a network; a transmitter; a processor configured to: control the transmitter to send a request for base station information to a server; and a receiver for receiving a response message in response to the request for base station information, said response message including a code value indicating at least whether or not there is at least one CBSD providing coverage to the current location of the UE device.

While various features discussed in the summary are used in some embodiments it should be appreciated that not all features are required or necessary for all embodiments and the mention of features in the summary should in no way be interpreted as implying that the feature is necessary or critical for all embodiments.

Numerous additional features and embodiments are discussed in the detailed description which follows.

BRIEF DESCRIPTION OF THE FIGURES

FIG. 4 is a drawing of an exemplary GeoLocation List (GLL), included in a UE device, in accordance with an exemplary embodiment.

DETAILED DESCRIPTION

Figure 1:
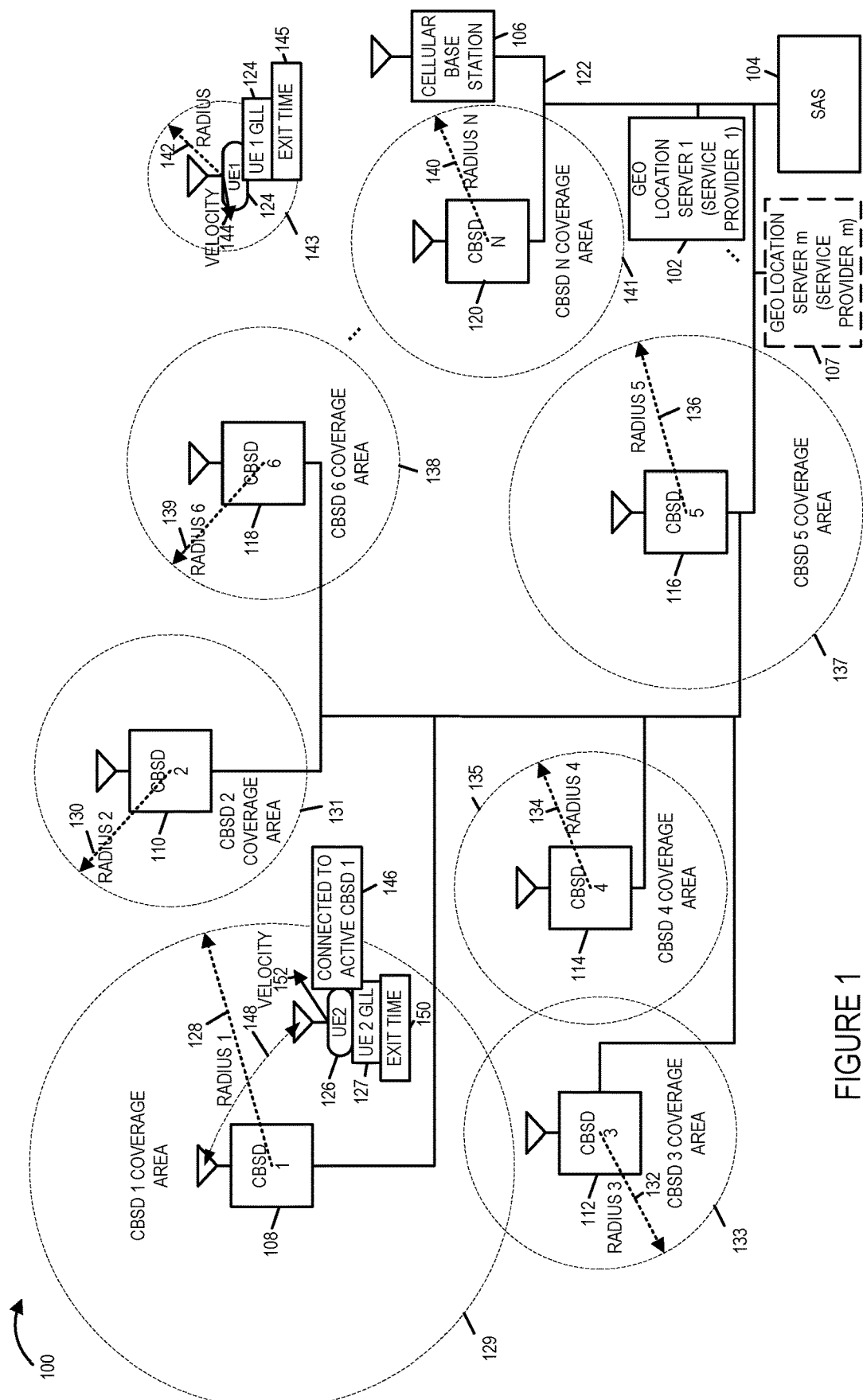
FIG. 1 is a drawing of an exemplary communications system in accordance with an exemplary embodiment.

FIG. 1 is a drawing of an exemplary communications system 100 in accordance with an exemplary embodiment. Exemplary system 100 supports Citizens Broadband Radio Services communications. Exemplary communications system 100 includes one or more geolocation servers (geolocation server 1 102 corresponding to service provider 1, . . . , geolocation server m 107 corresponding to service provider m), a Spectrum Access System (SAS) 104, a cellular base station 106, and a plurality of Citizens Broadband Radio Services Devices (CBSDs) (CBSD 1 108, CBSD 2 110, CBSD 3 112, CBSD 4 114, CBSD 5 116, CBSD 6 118, . . . , CBSD N 120) coupled together via backhaul network 122. Each CBSD is, e.g. a fixed location base station supporting Citizens Broadband Radio Services (CBRS). The SAS 104 assigns authorized CBSDs to specific frequencies. Exemplary communications system 100 further includes a plurality of user equipment (UE) devices including UE 1 124, e.g., a first mobile end user device (EUD 1) and UE 2 126, e.g., a second mobile end user device (EUD 2). Each of the CBSDs (CBSD 1 108, CBSD 2 110, CBSD 3 112, CBSD 4 114, CBSD 5 116, CBSD 6 118, . . . , CBSD N 120) has a CBSD coverage area (CBSD 1 coverage area 129, CBSD 2 coverage area 131, CBSD 3 coverage area 133, CBSD 4 coverage area 135, CBSD 5 coverage 137, CBSD 6 coverage area 138, . . . , CBSD N coverage area 141), and a corresponding radius of the coverage area (radius 1 128, radius 2 130, radius 3 132, radius 4 134, radius 5 136, radius 6 139, . . . , radius N 140), respectively. At different times a different set of CBSDs in the system may be active. Each geolocation server, e.g., geolocation server 102 corresponding to service provider 1 or geolocation server m 107 corresponding to service provider m, maintains a list of active CBSDs, e.g., corresponding to a service provider, which is updated, e.g., periodically and/or in response to changing conditions. In some embodiments, updating of a geolocation server, e.g., geolocation server 1 102 or geolocation server m 107 is infrequent, and thus information including its list of active CBSD may be, and sometimes is stale. In some embodiments, the list of active CBSDs included in a geolocation server, is larger, e.g., much larger, e.g., at least 5 times larger, than the maximum size of a geolocation list (GLL) mainlined by a UE. Each UE maintains its own customized GLL which includes entries corresponding to the areas which it frequents.

In FIG. 1, UE 1 124 is shown to be located currently outside a CBSD coverage area. UE 1 124 includes its own stored GLL, which is UE 1 GLL 124, has a search radius 142, used for searching for active CBSDs, has a current search area 143, based on UE1's position at search initiation and the search radius 142, and has a current velocity, as indicated by velocity vector 144. UE 1 124 also has a determined exit time 145 at which point UE 1 124 is estimated to leave the area 143. In various embodiments, a new search for active CBSDs is performed when the exit time is reached.

In FIG. 1, UE 2 126 is shown to be currently located in the coverage area 129 of CBSD 1 108, which is currently active, and UE 2 126 is connected to CBSD 1 108 via a wireless communications link 148. UE 2 126 includes its own stored GLL, which is UE 2 GLL 127, which includes an information set corresponding to CBSD 1 108 and possibly one or more CBSD information sets. UE 2 126 has a determined velocity, as indicated by velocity vector 152 and an estimated exit time 150 at which UE 2 126 is expected to leave coverage area 129, e.g., based on the position of UE 2 126 and the velocity 152 of UE 2 126.

Figure 2A:
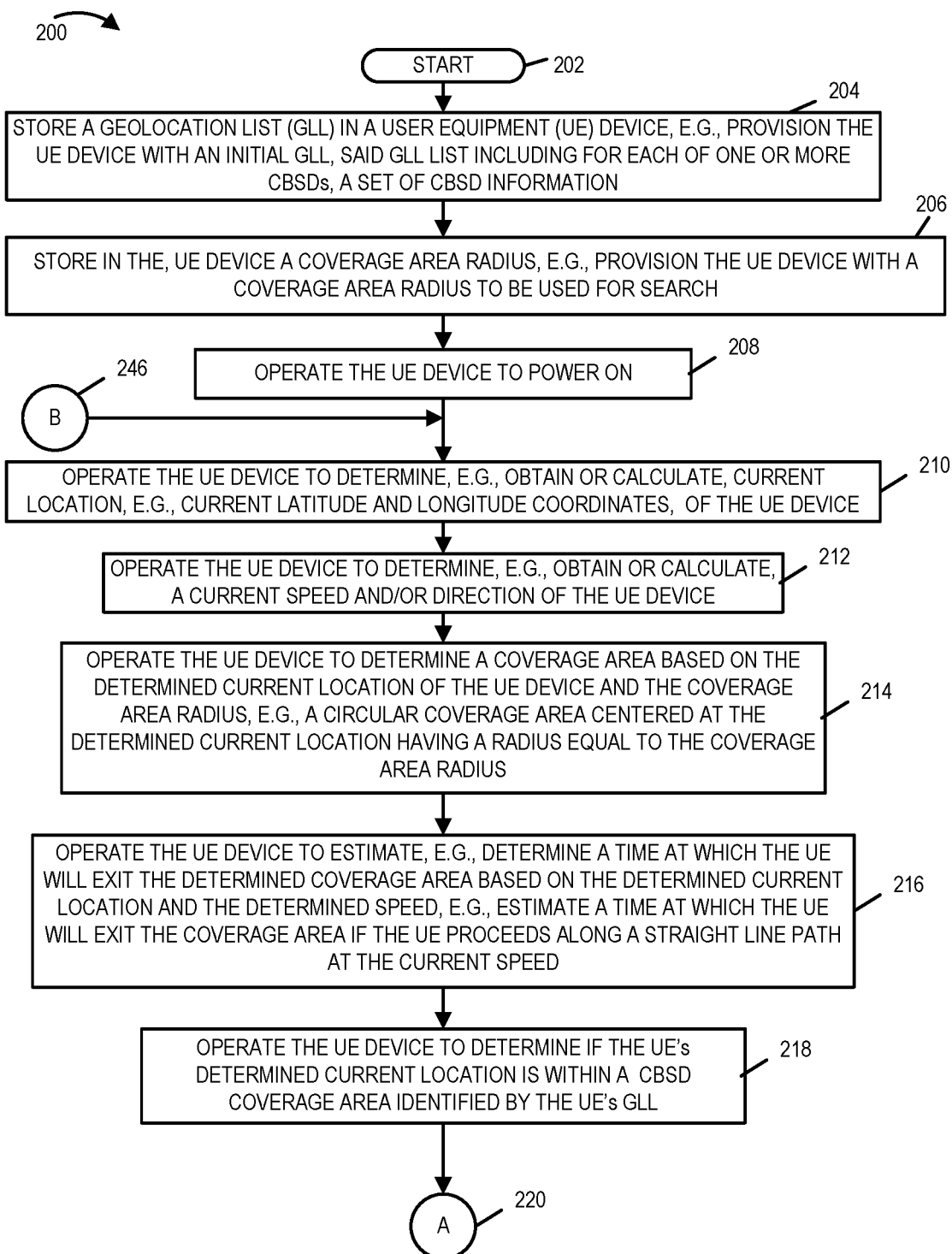
FIG. 2A is a first part of a flowchart of an exemplary method of operating a communications system in accordance with an exemplary embodiment.
Figure 2B:
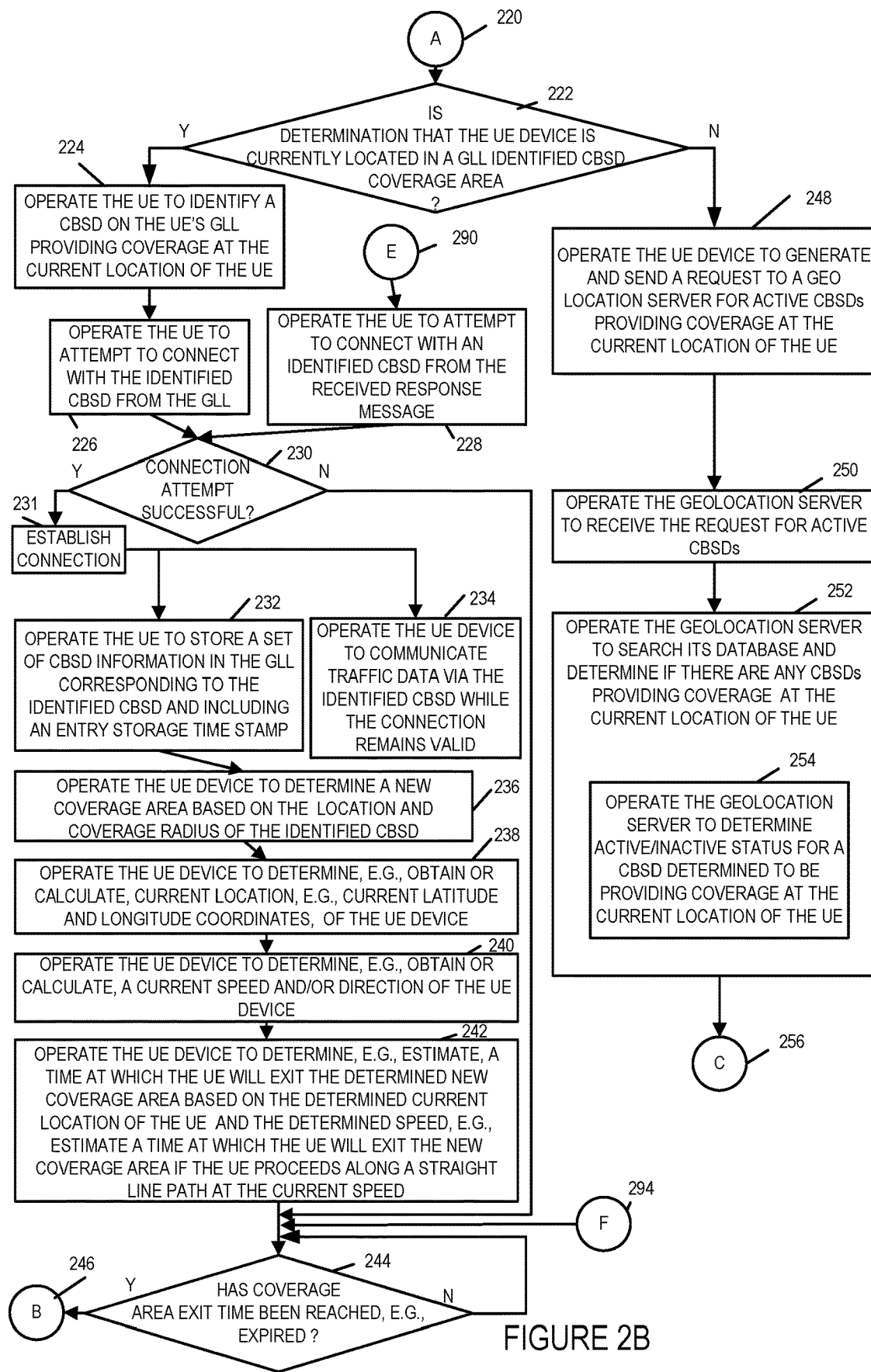
FIG. 2B is a second part of a flowchart of an exemplary method of operating a communications system in accordance with an exemplary embodiment.
Figure 2C:
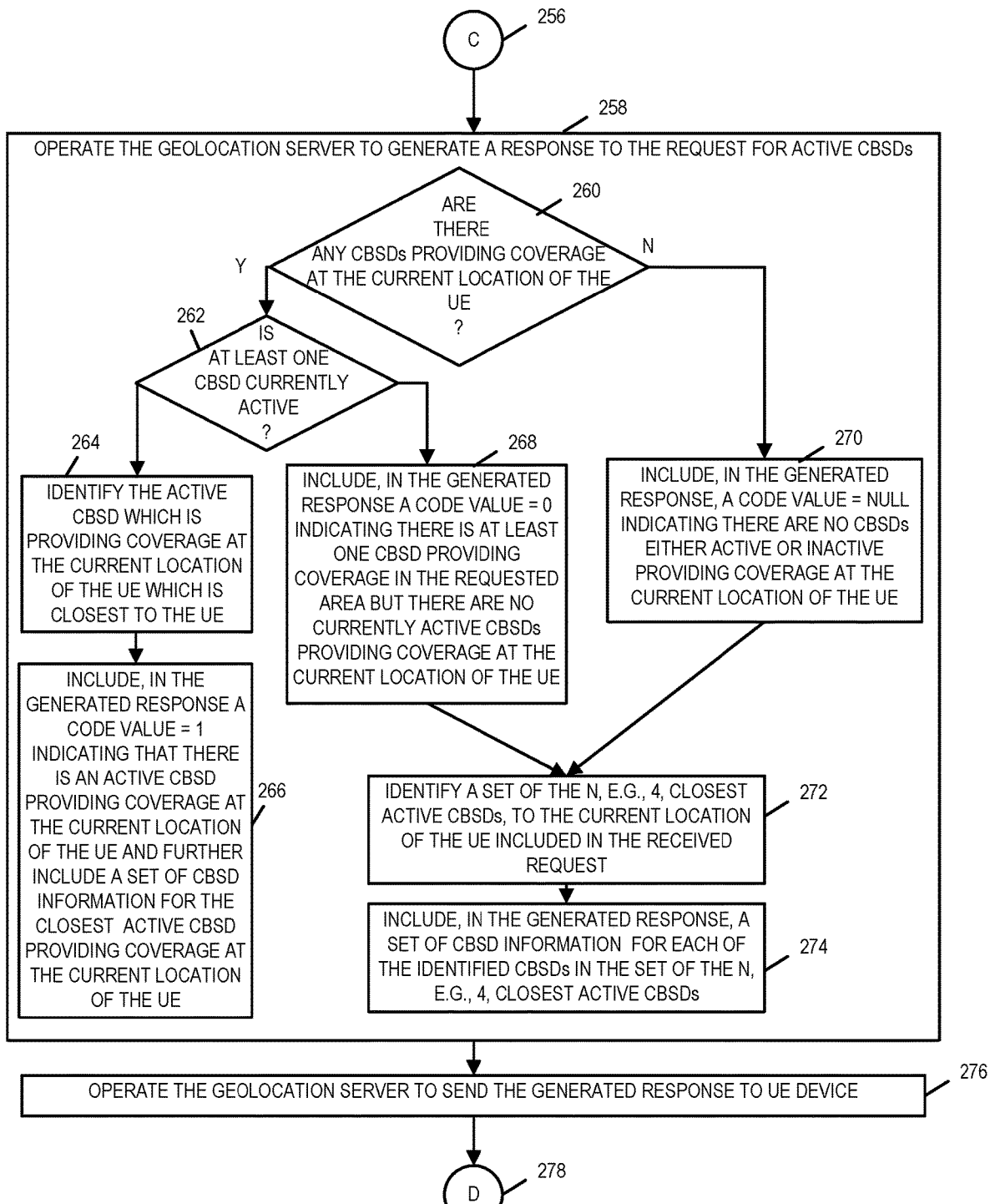
FIG. 2C is a third part of a flowchart of an exemplary method of operating a communications system in accordance with an exemplary embodiment.
Figures 2, 2D:
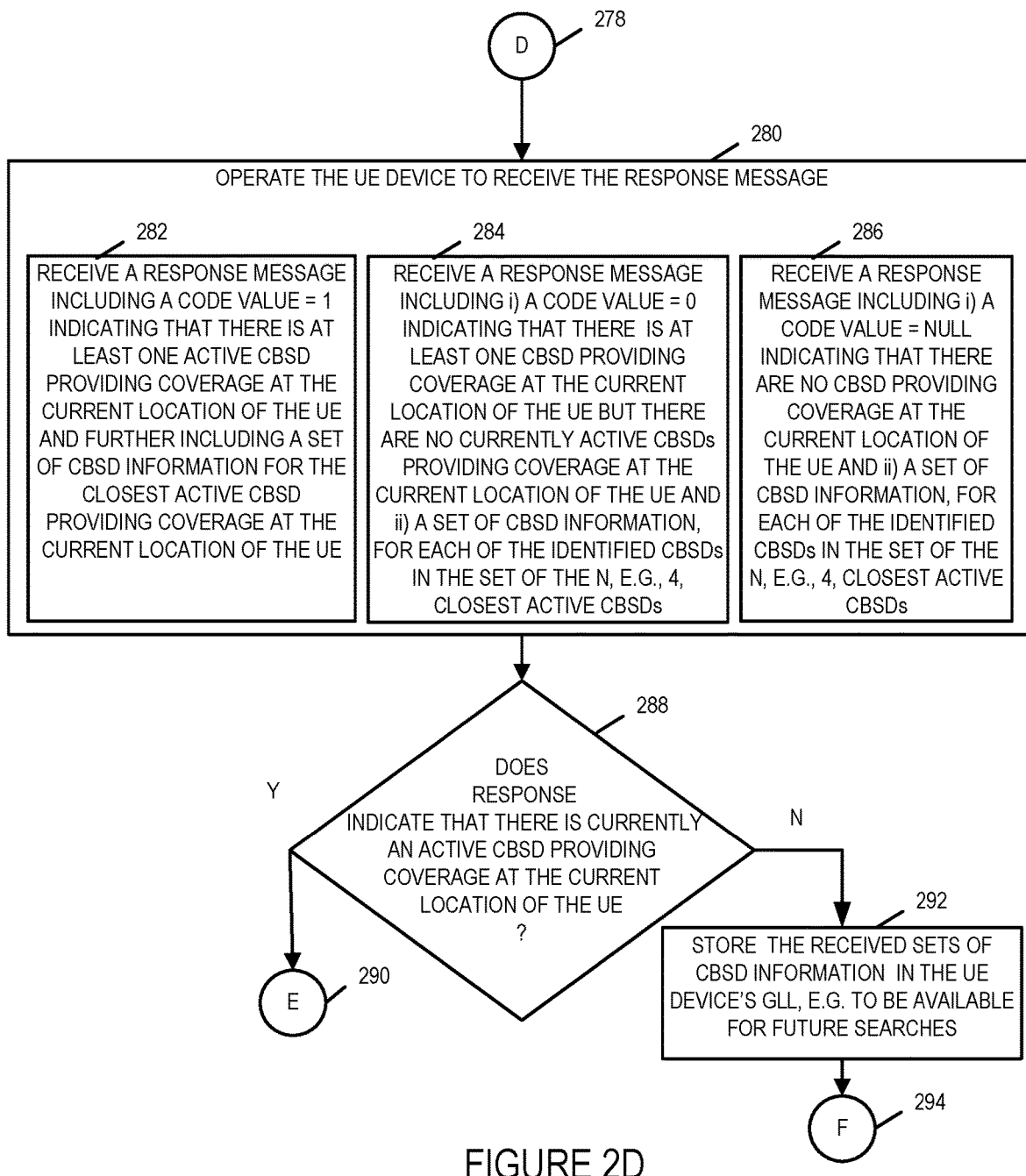
FIG. 2D is a fourth part of a flowchart of an exemplary method of operating a communications system in accordance with an exemplary embodiment.
FIG. 2 comprises the combination of FIG. 2A, FIG. 2B, FIG. 2C and FIG. 2D.

FIG. 2, comprising the combination of FIG. 2A, FIG. 2B, FIG. 2C and FIG. 2D, is a flowchart 200 of an exemplary method of operating a communications system in accordance with an exemplary embodiment. The communications system is, e.g., a communications system supporting CBRS such as communications system 100 of FIG. 1. Operation starts in step 202, in which a UE device is powered on, and proceeds from start step 202 to step 204. In step 204 a GeoLocation List (GLL) is stored in the user equipment (UE) device, e.g., the UE device is provisioned with an initial GLL, said GLL including for each of one or more Citizens Broadband radio Service Devices (CBSDs) a set of CBSD information. Operation proceeds from step 204 to step 206.

In step 206, a coverage area radius is stored in the UE device, e.g., the UE device is provisioned with a coverage area radius to be used for search. Following provisioning the UE device may be and sometimes is, powered down. Operation proceeds from step 206 to step 208. Following provisioning the UE device may be and sometimes is, powered down. In step 208 the UE device is powered on. Operation proceeds from step 208 to step 210.

In step 210 the UE device determines, e.g., obtains or calculates, the current location, e.g. current latitude and longitude coordinates, of the UE device. In some embodiments, in step 210 the UE device also determines its current altitude. Operation proceeds from step 210 to step 212.

In step 212 the UE device determines, e.g. obtains or calculates, a current speed and/or a current direction of the UE device. Operation proceeds from step 212 to step 214.

In step 214 the UE device determines a coverage area based on the determined location of the UE device and the coverage area radius, e.g., a circular coverage area centered at the determined current location having a radius equal to the coverage area radius. Operation proceeds from step 214 to step 216.

In step 216 the UE device estimates, e.g., determines, a time at which the UE will exit the determined coverage area based on the determined current location and the determined speed, e.g., estimate a time at which the UE will exit the coverage area if the UE proceeds along a straight line path at the current speed. Operation proceeds from step 216 to step 218.

In step 218 the UE device determines if the UE's determined current location is within a CBSD coverage area identified by the UE's GLL. Operation proceeds from step 218, via connecting node A 220, to step 222.

In step 222, if the determination is that the UE device is currently located in a GLL identified CBSD coverage area, then operation proceeds from step 222 to step 224; otherwise, operation proceeds from step 222 to step 248.

In step 224 the UE device identifies a CBSD on the UE's GLL providing coverage at the current location of the UE. If there are more the one CBSDs listed in the UE's GLL as providing coverage at the current location of the UE, the closest CBSD to the UE is identified from among the one or more CBSDS providing coverage at the current location of the UE. Operation proceeds from step 224 to step 226. In step 226 the UE attempts to connect with the identified CBSD from the GLL. Operation proceeds from step 226 to step 230.

In step 230 if the connection attempt is successful, as indicated by block 231, then operation proceeds from step 230 to steps 232 and 234; otherwise, operation proceeds from step 230 to step 244.

In step 232 the UE stores a set of CBSD information in the GLL corresponding to the identified CBSD and including an entry storage time stamp. In step 234 the UE device communicates traffic data via the identified CBSD while the connection remains valid. Operation proceeds from step 232 to step 236.

In step 236 the UE device determines a new coverage area based on the location and coverage radius of the identified CBSD. Operation proceeds from step 236 to step 238.

In step 238 the UE device determines, e.g. obtains or calculates, current location, e.g., current latitude and longitude coordinates, of the UE device. In some embodiments, the UE also determines current altitude of the UE device. Operation proceeds from step 238 to step 240.

In step 240 the UE device determines, e.g. obtains or calculates, a current speed and/or direction of the UE device. Operation proceeds from step 240 to step 242. In step 242 the UE device determines a time at which the UE will exit the determined new coverage area based on the determined current location of the UE and the determined speed, e.g., the UE device estimates a time at which the UE will exit the new coverage area if the UE proceeds along a straight line path at the current speed. Operation proceeds from step 242 to step 244.

Returning to step 248, in step 248 the UE device generates and sends a request to a geolocation server for active CBSDs providing coverage at the current location of the UE. In some embodiments, the request includes the current location of the UE. In some embodiments, the request includes the current location of the UE and a search radius value being used by the UE. Operation proceeds from step 248 to step 250. In step 250 the geolocation server receives the request for active CBSDs. Operation proceeds from step 250 to step 252. In step 252 the geolocation server searches its database and determines if there are any CBSDs providing coverage at the current location of the UE. Step 252 includes step 254 in which the geolocation server determines active/inactive status for a CBSD determined to be providing coverage at the current location of the UE. Step 254 may be, and sometimes is, performed for a plurality of CBSDs. Operation proceeds from step 252, via connecting node C 256 to step 258.

In step 258 the geolocation server generates a response to the received request for active CBSDs. Step 258 includes steps 260, 262, 264, 266, 268, 270, 272 and 274. In step 260 the geolocation server determines if there are any CBSDs providing coverage at the current location of the UE. If there is at least one CBSD providing coverage at the current location of the UE, then operation proceeds from step 260 to step 262; however, if there are not any CBSDs providing coverage at the current location of the UE, then operation proceeds from step 260 to step 270.

In step 262 the geolocation server determines whether or not at least one of the CBSD providing coverage at the current location of the UE is currently active. If there is at least one CBSD, providing coverage at the current location of the UE, which is currently active, then operation proceeds from step 262 to step 264; otherwise, operation proceeds from step 262 to step 268.

In step 264 the geolocation server identifies the active CBSD which is providing coverage at the current location of the UE which is the closest to the UE. Operation proceeds from step 264 to step 266. In step 266 the Geolocation server includes, in the generated response a code value=1 indicating that there is an active CBSD providing coverage at the current location of the UE and further including a set of CBSD information for the closest active CBSD providing coverage at the current location of the UE.

Returning to step 268, in step 268 the geolocation server includes, in the generated response a code value=0 indicating that there is at least one CBSD providing coverage in the requested area but there are no currently active CBSDs providing coverage at the current location of the UE. Operation proceeds from step 268 to step 272.

Returning to step 270, in step 270 the geolocation server includes, in the generated response, a code value=null indicating that there are no CBSDs, either active or inactive, providing coverage at the current location of the UE. Operation proceeds from step 270 to step 272.

In step 272, the geolocation server identifies a set of the N, e.g., 4, closest active CBSDs, to the current location of the UE included in the received request. Operation proceeds from step 272 to step 274.

In step 274 the geolocation server includes, in the generated response, a set of CBSD information for each of the identified CBSDs in the set of N, e.g. 4, closest active CBSDs.

Operation proceeds from step 258 to step 276. In step 276 the geo location server sends the generated response to the UE device. Operation proceeds from step 276, via connecting node D 278, to step 280.

In step 280, the UE device receives the response message from the geolocation server. Step 282 includes steps 282, 284 and 286. In each iteration of step 280 one of steps 282, 284 and 286 is performed. In step 282 the UE receives a response message including a code value=1, indicating that there is at least one active CBSD providing coverage at the current location of the UE, and further including a set of CBSD information for the closet active CBSD providing coverage at the current location of the UE. In step 284 the UE receives a response message including: i) a code value=0, indicating that there is at least one CBSD providing coverage at the current location of the UE but there are no currently active CBSDs providing coverage at the current location of the UE, and ii) a set of CBSD information for each of the identified CBSDs in the set of N, e.g., 4, closest active CBSDs. In step 286 the UE receives a response message including: i) a code value=null, indicating that there are no CBSDs providing coverage at the current location of the UE and ii) a set of CBSD information for each of the identified CBSDs in the set of N, e.g., 4, closest active CBSDs. Operation proceeds from step 280 to step 288.

In step 288 the UE device determines if the received response indicates that there is a currently active CBSD providing coverage at the current location of the UE. If the determination is that there is a currently active CBSD providing coverage at the current location of the UE, then operation proceeds from step 288, via connecting node E 290 to step 228; otherwise, operation proceeds from step 288 to step 292. In step 228, the UE attempts to connect with the identified CBSD from the received response message. Operation proceeds from step 228 to step 230.

Returning to step 292, in step 292 the UE device stores the received sets of CBSD information in the UE device's GLL, e.g., to be available for future searches. Operation proceeds from step 292, via connecting node F 294, to step 244.

In step 244, the UE device determines if the coverage area exit time has expired. If the determination is that the coverage area exit time has not yet expired, then operation proceeds from step 244 to the input of step 244. However, if the determination of step 244 is that the coverage area exit time has expired, then operation proceeds from step 244, via connecting node B 246, to the input of step 210, in which the UE determines a new current location of the UE device.

Figure 3:
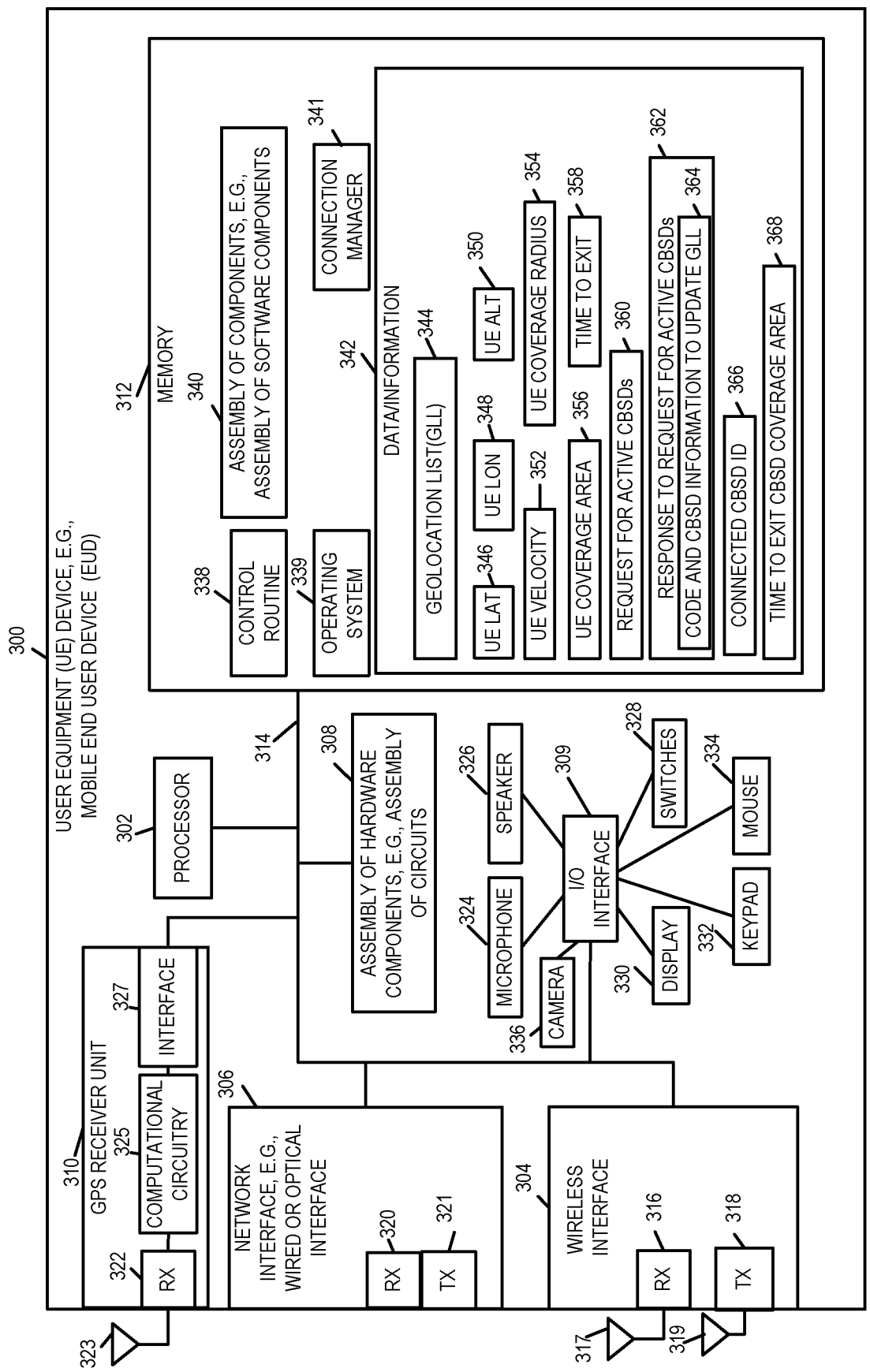
FIG. 3 is a drawing of an exemplary user equipment (UE) device, e.g. a mobile end user device (EUD), in accordance with an exemplary embodiment.

FIG. 3 is a drawing of an exemplary user equipment (UE) device 300, e.g. a mobile end user device (EUD) supporting CBRS communications, in accordance with an exemplary embodiment. UE device 300 is, e.g., UE 1 124 of FIG. 1, UE 2 126 of FIG. 1, a UE implementing steps of flowchart 200 of FIG. 2, UE 602 of FIG. 6 or FIG. 7, a UE implementing the steps of flowchart 800 of FIG. 8, UE 901 of FIG. 9, and/or a UE implementing the steps of flowchart 1000 of FIG. 10.

Exemplary UE device 300 includes a processor 302, e.g., a CPU, a wireless interface 304, a network interface 306, e.g., a wired or optical interface, an assembly of hardware components 308, e.g., an assembly of circuits, an I/O interface 309, a GPS receiver unit 310, e.g., an embedded GPS receiver circuit board or GPS chip, and a memory 312 coupled together via a bus 314 over which the various components may interchange data and information. Wireless interface 304 includes a wireless receiver 316 and a wireless transmitter 318. Wireless receiver 316 is coupled to a receive antenna 317, via which UE 300 receives wireless signals from base stations, wherein at least some of the base stations are CBSD devices. Wireless transmitter 318 is coupled to a transmit antenna 319, via which UE 300 transmits wireless signals to base stations, wherein at least some of the base stations are CBSD devices. In some embodiments, the same antenna is used for receive and transmit. In some embodiments, multiple antennas and/or multiple antenna elements are used for transmit and/or receive. Network interface 306 includes a receiver 320 and a transmitter 321, via which the UE 300 can communicate with other devices, e.g., network nodes, when the UE 300 is physically connected to via a wired or optical interface, e.g. to a backhaul network or local wired network. GPS receiver unit 310 includes a GPS wireless receiver 322 coupled to GPS antenna 323 via which UE 300 receives GPS signals, computational circuitry 325, which calculates UE 300 position and velocity based on received GPS signals, and an interface 327 which formats and outputs data, e.g., GPS messages, including, e.g., time information, latitude information, longitude information, altitude information, and velocity information, to the internal bus 314 of UE 300.

UE device 300 further includes a microphone 324, a speaker 326, switches 328, a display 330, e.g., a touchscreen display serving as both an input and output device, a keypad 332, a mouse 334, and a camera 336, coupled to I/O interface 309, via which the various I/O devices (326, 324, 328, 330, 332, 334, and 336, may communicate with other components, e.g., including processor 302 and memory 312, within UE 300.

Memory 312 includes a control routine 338, an operating system 339, an assembly of components 340, e.g., an assembly of software components, a connection manager 341, and data/information 342. Data/information 342 includes a geolocation list (GLL) 344, UE latitude 346, UE longitude 348, UE altitude 350, UE velocity 352, a UE coverage radius value 354, a UE coverage area 354 based on the UE radius 354, a time to exit coverage area 358, a generated request for active CBSDs 360 to be sent to a geolocation server, a received response 362 to the request for active CBSDs 360. The response 362 includes a code, e.g., a code value=1, 0 or null, and CBSD information, e.g., one set of CBSD information corresponding to an active CBSD in range of the UE, or 4 sets of CBSD information corresponding to the closest 4 active CBSDs, e.g. which are not currently in the range of the UE, to be used to update the GLL 364. Data/information 342 further includes a connected CBSD ID 366, and a determined time to exit the CBSD coverage area 368 of the CBSD to which the UE is presently connected.

FIG. 4 is a drawing of an exemplary GeoLocation List (GLL) 400, included in a UE device in accordance with an exemplary embodiment. The UE device including GLL 400 is, e.g., any of UE device 300, UE 1 124 of FIG. 1, UE 2 126 of FIG. 1, a UE implementing steps of flowchart 200 of FIG. 2, UE 602 of FIG. 6 or FIG. 7, a UE implementing the steps of flowchart 800 of FIG. 8, UE 901 of FIG. 9, and/or a UE implementing the steps of flowchart 1000 of FIG. 10.

First column 402 includes table index number information. Second column 404 includes timestamp information, e.g., POSIX time or EPOCH time, for storing the entry corresponding to a CBSD. Third column 406 includes CBSD ID information, e.g., a systemwide unique identifier for a registered CBSD. Fourth column 408 includes a CBSD channel list information, e.g. a list of channels used by the CBSD. Fifth column 410 includes CBSD Effective (or Equivalent) Isotropic Radiated Power (EIRP) information, e.g., authorized EIRP levels provided by Spectrum Access System (SAS). Sixth column 412 includes coverage radius information, e.g. based on EIRP and provided by geolocation server, e.g., a calculated average coverage distance for the CBSD. Seventh column 414 includes CBSD longitude information, e.g., the longitude coordinates of the CBSD. Eighth column 416 includes CBSD latitude information, e.g., the latitude coordinates of the CBSD. Ninth column 418 includes CBSD AGL, e.g., the altitude location coordinates of the CBSD above ground level. Tenth column 420 includes CBSD owner information 420, e.g., the name or ID of the CBSD operator.

First row 422 includes column header information. Second row 424 includes a stored set of information corresponding to a first CBSD. Third row 426 includes a stored set of information corresponding to a second CBSD. Fourth row 428 includes a stored set of information corresponding to a third CBSD. Row 430 includes a stored set of information corresponding to an Nth CBSD. In some embodiments N may be, and sometimes, is a value in the range of 100 to 200.

Various aspects and/or features of some embodiments of the present invention are further described below.

Spectrum management systems include the Spectrum Access System (SAS) for Citizens Broadband Radio Services (CBRS) and the Automated Frequency Control (AFC) for the 6 GHz U-NII5 and U-N117. SAS is a new system to manage spectrum resources across incumbent, priority access license and general authorized access usage. SAS can be, and sometimes is, used to obtain location of active CBSDs.

After a CBSD is registered, given a spectrum band and authorized by the SAS a data record is created. SAS will store in its database a record for all authorized CBSDs and their attributes including location, type and operator ID.

The SAS supports an API for pulling/pushing CBSD records that belong to specific carrier's based on the carrier ID. The carrier will store values pulled from the SAS system in a server called the geolocation server. The geolocation server will store received data or execute a pull for all changes every time interval, e.g., every one hour, to obtain a list of all authorized CBSDs that belong to the carrier and their attributes including the location. The geolocation server will store the information in a database.

The user equipment (UE) defines a coverage area based on its existing location, e.g., longitude and latitude, and radius distance. The UE will pull the geolocation server for available coverage of CBSD within a coverage area and update the coverage area longitude and latitude at the time of pulling the geolocation server. The UE will update the coverage area every time interval or when the UE exits the existing coverage area. The UE will check if there is an active CBSD within the coverage area by sending its location to the geolocation server. The geolocation server will respond with a code indicating if there is coverage or not.

Figure 5:
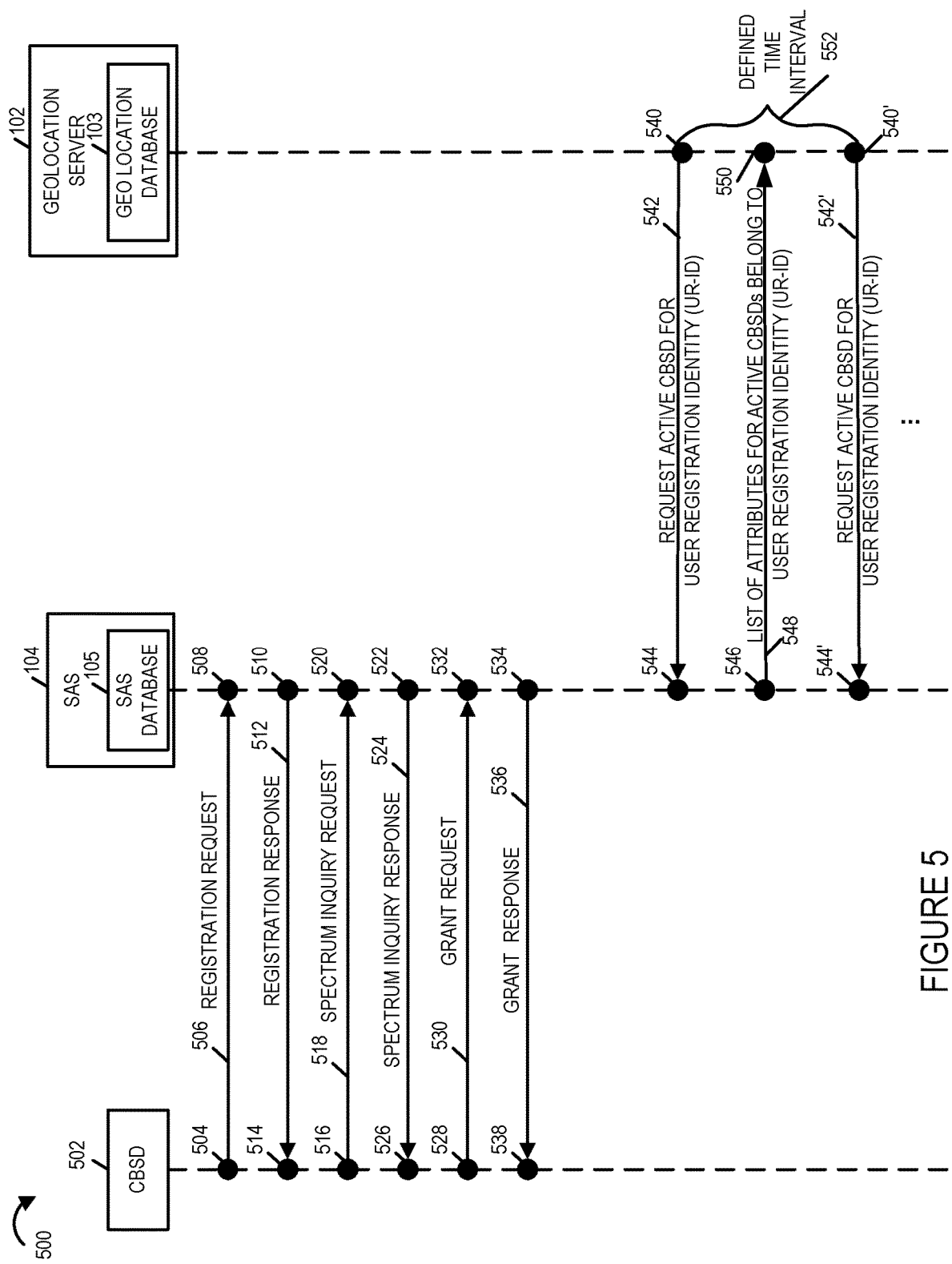
FIG. 5 is a drawing used to illustrate exemplary steps and signals including operating a geolocation server to obtain location of a registered CBSD from an SAS in accordance with an exemplary embodiment.

FIG. 5 is a drawing 500 used to illustrate exemplary steps and signals including operating a geolocation server to obtain location of a registered CBSD from an SAS in accordance with an exemplary embodiment. Drawing 500 includes an exemplary CBSD 502, an exemplary SAS 104 including an SAS database 105 and an exemplary geolocation server 102 including a geolocation database 103. Exemplary CBSD 502 is, e.g., one of the CBSDs (CBSD 1 108, CBSD 2 110, CBSD 3 112, CBSD 4 114, CBSD 5 116, CBSD 6 118, . . . , CBSD N 120) of system 100 of FIG. 1.

In step 504, CBSD 502 generates and sends registration request signal 506 to SAS 104. In step 508 SAS database 104 receives the registration request, recovers the communicated information. In step 510, the SAS 104 generates and sends a registration response signal 512 to the CBSD 502. In step 514, CBSD 502 receives the registration response and recovers the communicated information. In step 516 CBSD 502 generates and sends a spectrum inquiry request signal 518 to SAS 104. In step 520 the SAS 104 receives the spectrum inquiry request and recovers the communicated information. In step 522 the SAS 104 generates and sends a spectrum inquiry response 524 to CBSD 502. In step 526 CBSD 502 receives the spectrum inquiry response and recovers the communicated information. In step 528 the CBSD 502 generates and sends a grant request signal 530 to SAS 104. In step 532 the SAS 104 receives the grant request and recovers the communicated information. In step 534 the SAS 104 generates and sends a grant response signal 536 to the CBSD 502. In step 538 the CBSD receives the grant response signal and recovers the communicated information.

After the CBSD 502 is registered and authorized by the SAS 104, a data record of the authorized CBSD 502 and its attributes is stored in the SAS records or database 105. This processes is repeated for a plurality of CBSDs.

The SAS system 104 supports an API for pushing or pulling CBSD records based on the carrier's identification value. The carrier's geolocation server 102 can call the API to pull a list of all authorized CBSDs and their attributes including the location. The geolocation server 102 will store the information in a database 104. A geolocation server 102 can receive or call an update Pull every time interval to maintain the status of all CBSDs managed or used by the operator. The geolocation server 102 will store the data in a database 103 for future lookup.

In step 540 the geolocation server 102 generates and sends a request for active CBSDs for user registration identify (UR-ID) 542. In step 544 the SAS 104 receives the request for active CBSDs for user registration identify (UR-ID) and recovers the communicated information. In step 546 the SAS 104, accesses its database 104, recovers information in response to the received request, generates and sends a list of attributes of active CBSDs belonging to user registration identify (UR-ID) 546. In step 550 the geolocation server 102 receives the communicated list of attributes of active CBSDs belonging to user registration identify (UR-ID) and stores the received information in its database 103. In step 540' geolocation server 102 generates and sends, after the defined time interval 552 between transmitted requests for active CBSDs, another request for active CBSDs for user registration identify (UR-ID) 540' to the SAS 104. The process continues with the SAS 104 accessing its database 105 and responding to the request 542', and the geolocation server 102 receives the response and updates its information in its database 103.

Figure 6:
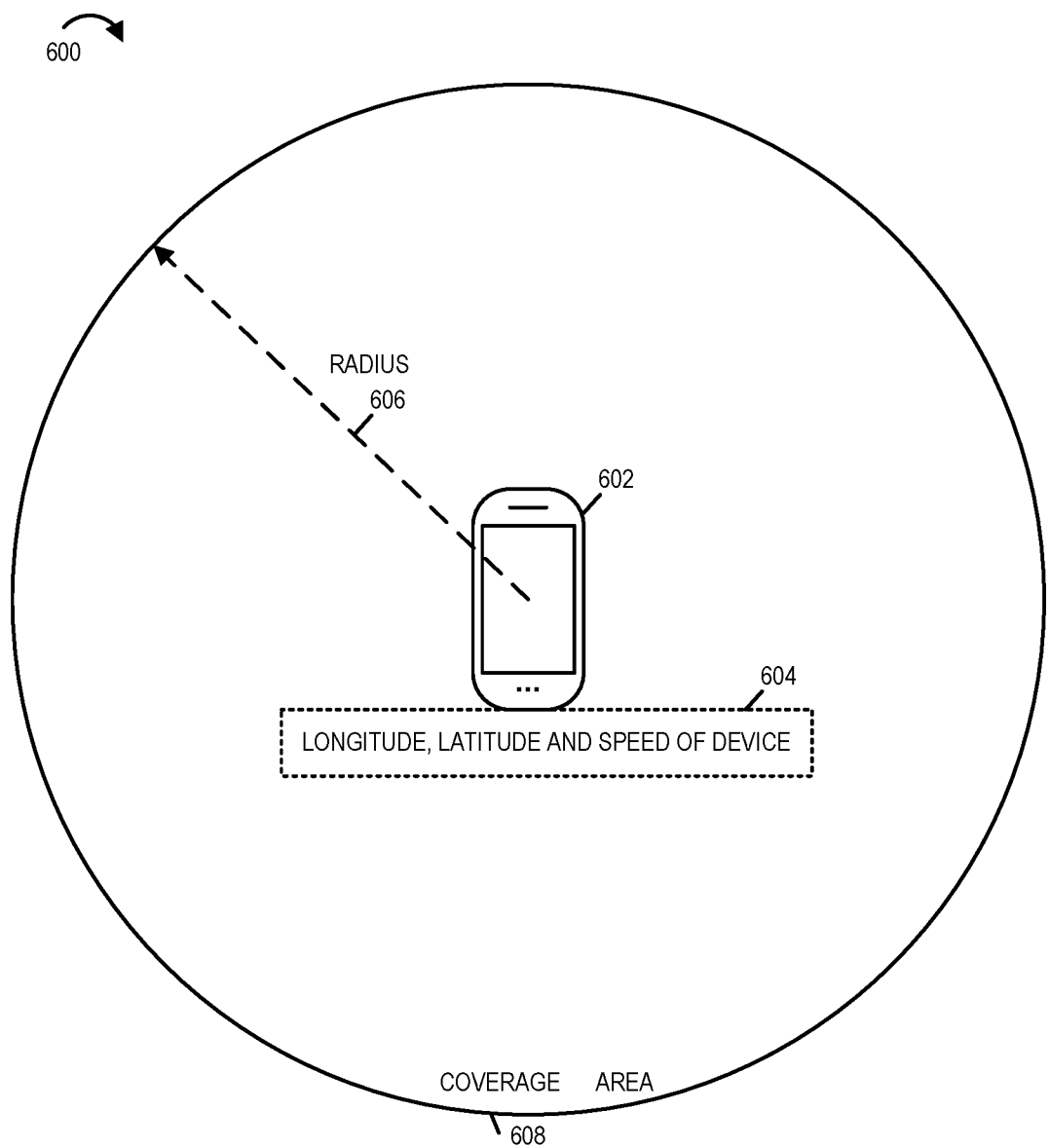
FIG. 6 is a drawing illustrating an exemplary user device, exemplary coverage area parameters and an exemplary coverage area, e.g., used for searching for active CBSDs and for determining when to initiate another search, in accordance with an exemplary embodiment.

FIG. 6 is a drawing 600 illustrating an exemplary user device 602, exemplary coverage area parameters and an exemplary coverage area, e.g., used for searching for active CBSDs and for determining when to initiate another search, in accordance with an exemplary embodiment. Drawing 600 includes an exemplary user device 602, e.g., a UE, with a radius distance 606 defining a coverage area 608. The user device 602 is, e.g. UE 1 124 or UE 2 126 of FIG. 1. The user device 602 has a current longitude, latitude and speed, as indicated by dotted line box 604.

The user device 602 will pull its current GPS location and combine it with a radius distance 606 to define a coverage area 608. In some embodiments, the radius distance 606 for the coverage area 608 can be, and sometimes is, configurable by the carrier. The user device 602 will use coverage area coordinates to look for CBSD coverage. The user device 602 will use the coverage area coordinates of an active CBSD and store a set of information corresponding to the CBSD for a visited area in a geolocation list within user device 602. In some embodiments, the user device 602 will store sets of information corresponding to active CBSDs in a fixed sized geolocation list (GLL) stored within the user device 602, e.g., a GLL which stores sets of information corresponding to a predetermined number, e.g., a number in the range of 50-100, of visited areas.

In some embodiments, the user device 602 uses the UE's existing speed (current speed) to predict the time required for the device to exit the coverage area, and this time is called Exit Time. In some embodiments a function in the user device 602 calculates a new coverage area after reaching the exit time. In some embodiments, if the speed of the user device 602 is zero and the user device 602 is stationary, the function will wait for a default period of time before calculating speed again.

Figure 7:
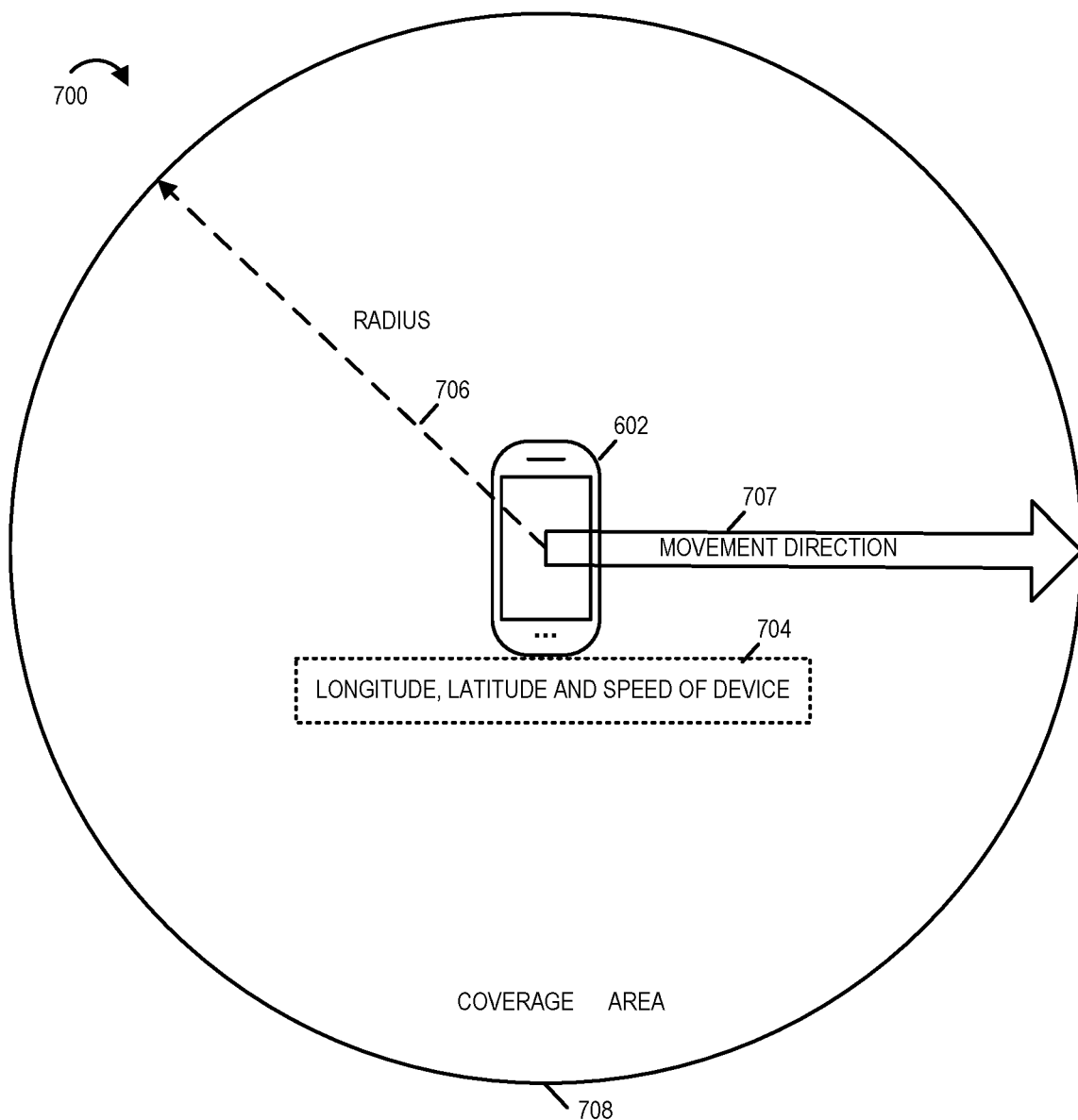
FIG. 7 is a drawing illustrating an exemplary user device, exemplary coverage area parameters, an exemplary coverage area, e.g., used for searching for active CBSDs and for determining when to initiate another search, and an exemplary direction of motion, in accordance with an exemplary embodiment.

FIG. 7 is a drawing 700 illustrating an exemplary user device 602, exemplary coverage area parameters, an exemplary coverage area, e.g., used for searching for active CBSDs and for determining when to initiate another search, and an exemplary direction of motion, in accordance with an exemplary embodiment. Drawing 700 includes exemplary user device 602, e.g., a UE, with a radius distance 706 defining a coverage area 708. The user device 602 is, e.g. UE 1 124 or UE 2 126 of FIG. 1. The user device 602 has a current longitude, latitude and speed, as indicated by dotted line box 704. In the example of FIG. 7, the user device 602 also has a movement direction as indicated by arrow 707. The radius 706 is larger than the radius 606, and the coverage area 708 is larger than the coverage area 608. The example of FIG. 6 and the example of FIG. 7 may correspond to different carriers.

Various aspects and/or features related to obtaining CBSD availability will now be described. A user device, e.g. User device 602, will maintain a list of coordinates of the latest coverage areas visited with active CBSD. This list is called the GeoLocation List (GLL). The list size can be, and sometimes is, configured by the carrier to allow rapid retrieval of coverage areas. When a user device enters a new coverage area it will search within its stored GLL first for available service within the coverage area.

If the user device does not find the existing coverage area or intersection of the coverage area within the GLL it will query the geolocation server.

If the geolocation server returns with a value=1 (indicating active CBSD found) and a set of information corresponding to the found CBSD, then the user device receives the communicated information and will update its GLL with the received communicated set of information corresponding to an identified CBSD including new coordinates and a radius distance of the active CBSD. If the GLL is full, the user device will purge the oldest entry on the list and insert the newest entry.

Alternatively, if the geolocation server returns with a value=0 (indicating no active CBSDs found in the search area) or returns with a value=null (indicating no CBSDs found either active or inactive in the search area), the geolocation server will include 4 sets of information corresponding to the 4 nearest active CBSDs (which are outside the search area). The user device receives the communicated information and will update its GLL with the received 4 sets of information corresponding to an identified 4 nearest active CBSD (outside the search area) including coordinates and a radius distance for each of the identified active CBSD. The UE device stores the four sets of information corresponding to the four nearest CBSDs in its GLL and waits unit the UE device exits its existing coverage area. Thus the GLL list has been updated with new entries which are available for the next search by the user device.

Figure 8:
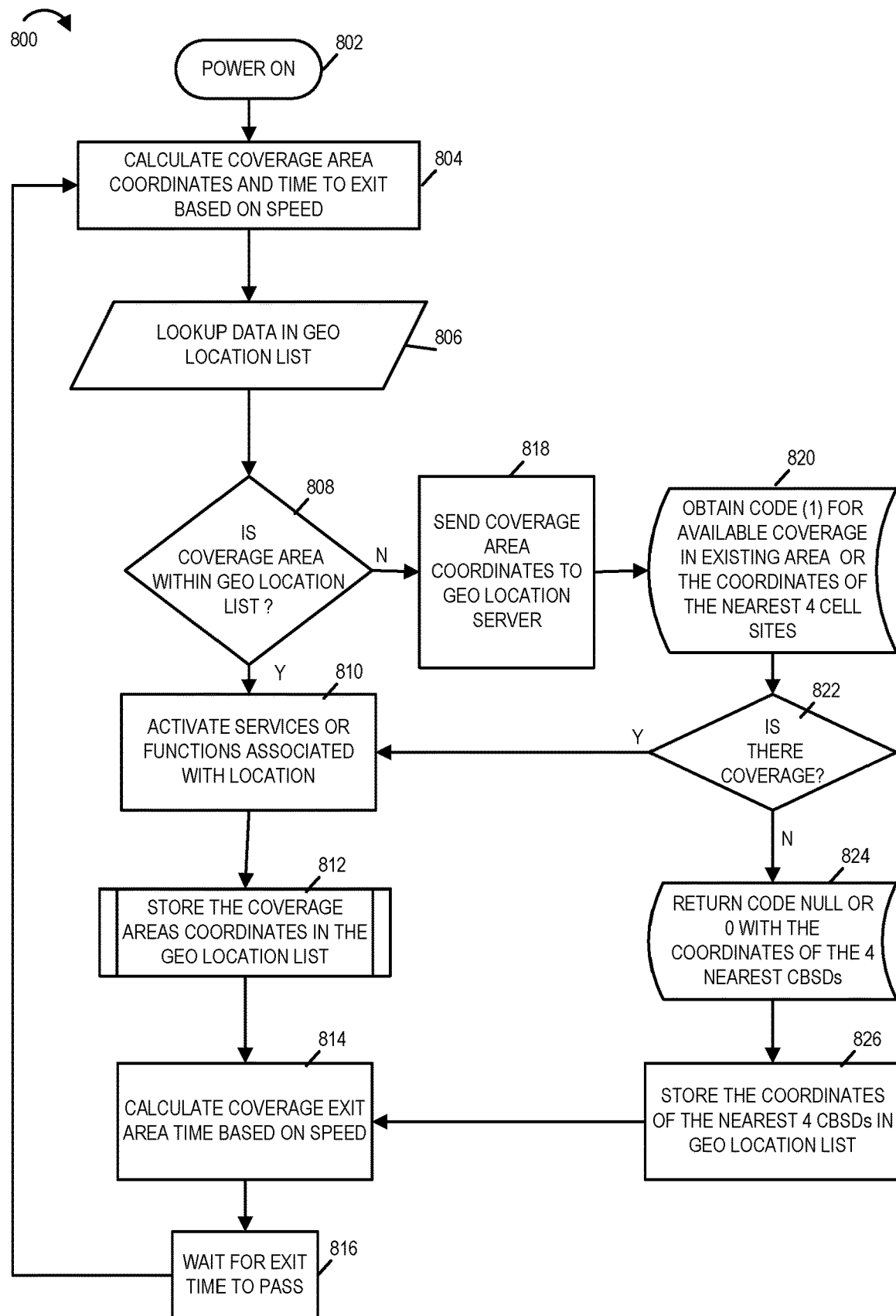
FIG. 8 is a flowchart of an exemplary method of operating a user equipment (UE) device in accordance with an exemplary embodiment.

FIG. 8 is a flowchart 800 of an exemplary method of operating a user equipment (UE) device in accordance with an exemplary embodiment. The user device implementing the method of flowchart 800 is, e.g. UE 124, UE 126, UE 300, UE 602, or UE 901. Operation of the exemplary method starts in step 802 in which the UE is powered on and initialized. Operation proceeds from step 802 to step 804. In step 804 the UE calculates coverage area coordinates and time to exit based on speed. In some embodiments, the UE's device's location and speed are determined by the UE based on received GPS signals, e.g., obtained as output from an embedded GPS receiver in the UE. In various embodiments, the UE's operating system (OS) or connection manager calculates the time to exit coverage area using the device speed and radius of the coverage area. In some embodiments, different carriers correspond to different radius values. Operation proceeds from step 804 to step 806.

In step 806 the user device will look up the current coordinates of the UE in its stored geolocation list (GLL) to see if there is CBRS coverage. Operation proceeds from step 806 to step 808.

In step 808 the user device determines if the coverage area is within the geolocation list. If it is determined that the value exists in the GLL, e.g., the current location of the UE is within a coverage area of one of the CBSDs as identified by the GLL, then operation proceeds from step 808 to step 810, in which the user device activates services or functions associated with the location, e.g., including connecting to an identified CBSD included in the GLL. Operation proceeds from step 810 to step 812.

In step 812, after successful connection with the identified CBSD, the UE device stores the coordinates, e.g., the coordinates of the identified CBSD, in the GLL. The storage includes a time tag and other information associated with the CBSD. See table 400 of FIG. 4 for exemplary information included in a GLL row entry. Operation proceeds from step 812 to step 814.

In step 814 the UE calculates the exit area time, e.g. recalculates exit time, based on speed, e.g., using the known location of the CBSD to which the UE is connected, the current location of the UE, the current speed and direction of the UE, and the radius coverage associated with the CBSD, the UE calculates the time at which the UE is expected to leave the coverage area of the CBSD to which it is connected. Operation proceeds from step 814 to step 816.

In step 816 the UE waits for the exit time to expire before proceeding to step 806 in which the UE calculates new coverage area coordinates and a new time to exit the search area based on speed.

Returning to step 808, if the UE determines that the value is not in the GLL, e.g., the current location of the UE is outside the CBSD coverage areas identified by the GLL, then operation proceed from step 808 to step 818.

In step 818 the UE sends coverage area coordinates to the Geolocation server, e.g., the UE sends a Get request to the Geolocation server requesting active CBSDs, the Get Request including the current location of the UE. Operation proceeds from step 818 to step 820.

In step 820 the UE receives and obtains: i) a code (e.g., value=1) indicating available coverage in the existing area, e.g., at the requested location of the UE, and a set of information corresponding to an identified active CBSD providing coverage, or ii) a code (e.g., value=0 or null) indicating no CBSDs currently providing coverage at the requested location of the UE (value=0 indicates no active CBSDs currently providing coverage at the requested location of the UE but there are inactive CBSDs which could provide coverage in the future if active/inactive status changes from inactive to active; value=null indicates that there are not any CBSDs (no active and no inactive CBSDs) which could provide coverage at the requested location of the UE) and 4 sets of information corresponding to the 4 nearest active CBSDs, which do not provide coverage at the current location of the UE. Operation proceeds from step 820 to step 822.

In step 822, if there is coverage, e.g. code=1, then operation proceeds from step 822 to step 810. However, in step 822, if there in not coverage, e.g. code=0 or null, then operation proceeds from step 822 to step 824.

In step 810 the user device activates services or functions associated with the location, e.g., including connecting to the identified active CBSD based on the received information from step 820. Operation proceeds from step 810 to step 812.

In step 812, after successful connection with the identified active CBSD, the UE device stores the coordinates, e.g., the coordinates of the identified CBSD, in the GLL. Operation proceeds from step 812 to step 814.

In step 814 the UE calculates the exit area time, e.g. recalculates exit time, based on speed, e.g., using the known location of the CBSD to which the UE is connected, the current location of the UE, the current speed and direction of the UE, and the radius coverage associated with the CBSD, the UE calculates the time at which the UE is expected to leave the coverage area of the CBSD to which it is connected. Operation proceeds from step 814 to step 816.

In step 816 the UE waits for the exit time to expire before proceeding to step 806 in which the UE calculates new coverage area coordinates a new time to exit the search area based on speed.

Returning to step 824, in step 824 the UE stores, e.g. in its memory, the return code of null or 0 with the coordinates of the 4 nearest CBSDs. Operation proceeds from step 824 to step 826.

In step 826 the UE stores a set of information for the 4 nearest CBSDs in its geolocation list, each stored set of information corresponding to a CBSD including coordinates of the CBSD. Operation proceeds from step 826 to step 814.

In step 814 the UE calculates the exit area time, e.g. recalculates exit time, based on speed, e.g., the current location of the UE, the current speed and direction of the UE, and the radius associated with the UE. Thus the UE calculates the time at which the UE is expected to leave the search coverage area. Operation proceeds from step 814 to step 816.

In step 816 the UE waits for the exit time to expire before proceeding to step 806 in which the UE calculates new coverage area coordinates a new time to exit the search area based on speed.

An exemplary GeoLocation List (GLL) definition will now be described. In some embodiments, the GLL is a flat file in format of .csv files or .txt files. The specific format and implementation of the geolocation list may, and sometimes does, vary as a function of device original equipment manufacturer (OEM) and carrier development implementation decisions.

Various aspects and/or features related to management of the GLL will now be described. In some embodiments, the GLL is managed by a native connection manager or an operating system (OS) on the device, e.g., UE. The GLL can be, and sometimes is, updated by the device, e.g. UE, when moving within coverage of offload network or by the geolocation server when the UE is mobile. In some embodiments, the GLL will include a time stamp for each entry and will include a limited number of entries, e.g. controlled by the OEM or carrier. In some embodiments, the maximum number of entries in the GLL is a value between 100 and 200. In various embodiments, if the GLL is full, the oldest values will be purged, e.g., a FIFO scheme is used.

In some embodiments, an exemplary GLL list includes, for an entry, a set of values for each of: i) time stamp, ii) CBSD ID, iii) CBSD channel, iv) CBSD EIRP, v) Coverage RADIUS, vi) CBSD Longitude, vii) CBSD Latitude, viii) CBSD AGL, and ix) CBSD owner. Time stamp reflects the Unix time, e.g., POSIX time or UNIX Epoch time, for storing the entry. The CBSD ID is the CBSD identifier, which is a system-wide unique identifier for a registered CBSD. The CBSD EIRP is the authorized Effective Isotropic Radiated Power (EIPR) levels, corresponding to the CBSD, provided by the SAS. Coverage RADIUS, which is based on EIRP and provided by the geolocation server, is a calculated average coverage distance for the CBSD. CBSD Longitude is the longitude location coordinates of the CBSD. CBSD Latitude is the latitude location coordinates of the CBSD. CBSD AGL is the altitude location coordinates of the CBSD (above ground level). CBSD owner is the name of ID of the CBSD operator.

With regard to bearing, in some embodiments the geolocation server will calculate the coverage area and sector bearing of the closest currently active CBSD to the UE, e.g., in response to a request from the UE. If the UE is within coverage area of a CBSD, the geolocation server will include a set of CBSD information in the response, e.g., a response including a code (e.g., value=1) indicating that there is an active CBSD which can provide coverage to the UE. In some embodiments, the geolocation server will exclude all CBSDs with sector that does not include the UE location, e.g., from consideration for inclusion in a response including a code (e.g., value=1) indicating that there is an active CBSD which can provide coverage to the UE.

Figure 9:
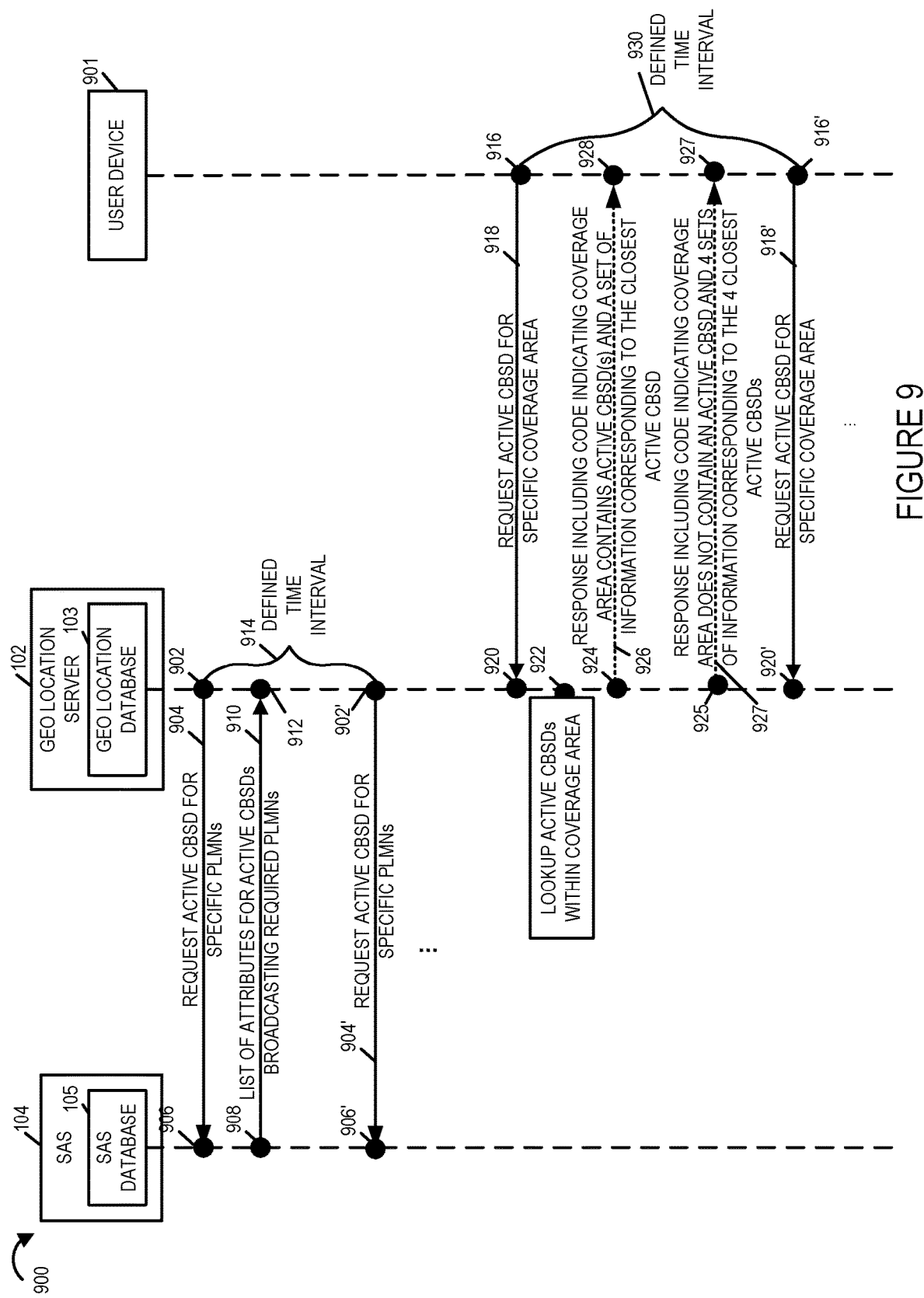
FIG. 9 is a drawing illustrating a geolocation server obtaining CBSD availability information from a SAS, and a UE device obtaining CBSD availability information from the geolocation server, in accordance with an exemplary embodiment.

Various aspects and/or featured related to obtaining CBSD availability from server will now be described. FIG. 9 is a drawing 900 illustrating a Geolocation server obtaining CBSD availability information from a SAS, and a UE device obtaining CBSD availability information from the Geolocation server, in accordance with an exemplary embodiment.

Drawing 900 includes an exemplary SAS 104 including an SAS database 105, an exemplary geolocation server 102 including a geolocation database 103, and an exemplary user device 901, e.g., a UE. Exemplary user device 901 is, e.g., UE 1 124 or UE 2 126 of system 100 of FIG. 1 or UE 602 of FIG. 6 or 7 or UE 300 of FIG. 3 or a UE implementing steps of method 200 of FIG. 2 or method 800 of FIG. 8.

In step 902 geolocation server 102 generates and send request signal 904, e.g., a request message, to SAS 104 requesting active CBSDs for specific Public Land Mobile Networks (PLMNs). In step 906 SAS 104 receives the request for active CBSDs for specific PLMNs and recovers the communicated information. In step 908 SAS 104 processes the received request, accesses its SAS database 105, uses the accessed information to generate a response signal 910, e.g., a response message, said response including a list of attributes for active CBSDs broadcasting required PLMNs, and sends the generated response signal to the geolocation server 102. In step 910 the geolocation server 102 receives the response signal 910, recovers the communicated information and updates its database 103, e.g., storing some or all of the received communicated information in its geolocation database 103. After a defined time interval 914, the geolocation server 102 in step 902' generates and sends another request signal 904', e.g., a request message, to SAS 104 requesting active CBSDs for specific PLMNs. The process continues with the SAS receiving, processing and responding to the request and with the geolocation server receiving and processing the response. Thus, the geolocation server 102 updates its database 103 on an ongoing basis.

In step 916 user device 901 generates and sends a request signal 918, e.g., request message, to geolocation server 918 requesting active CBSDs for a specific coverage area. In some embodiments, the request 918 includes coordinates of user device 901, e.g., longitude and longitude. In some embodiments, the request includes coordinates of the user device 901 and a radius value. In step 920 the geolocation server 102 receives the request, recovers the communicated information in the request and starts processing the request. In step 922, the geolocation server 102 accesses its database 103 and performs a lookup of active CBSDs within the coverage area of interest, e.g., looks for active CBSDs which provide coverage at the location of the UE. In some embodiments, if the geolocation server identifies multiple active CBSDs which provide coverage at the location of the UE, the geolocation server further identifies the active CBSD which is closest to the location of the UE.

In various embodiments, if the geolocation server 102 does not find any active CBSDs providing coverage at the location of the UE, the geolocation server 102 identifies the four nearest active CBSDs to the location of the UE. In some embodiments, the geolocation server 102 further identifies if there are any inactive CBSDs which could provide coverage at the location of the UE if they should transition to active state.

The geolocation server 102 generates and transmits a response to the received request 918. If the geolocation server has found at least one active CBSD which is providing coverage at the location of the UE, then the geolocation server performs step 924; alternatively, if the geolocation server 102 has not found any active CBSDs which are providing coverage at the location of the UE, then the geolocation server 102 performs step 925.

In step 924 the geolocation server 102 generates a response message 926 including a code (e.g., value=1) indicating coverage area contains active CBSD(s), e.g., the UE is located in the coverage area of an active CBSD, and further including a set of information corresponding to the closest active CBSD. In step 928, the user device 901 receives the response 926 and updates its GLL based on the information including the response.

In step 925 the geolocation server 102 generates a response message 927 including a code (e.g., value=0 or value=null) indicating coverage area does not contain an active CBSD e.g., the UE is located in an area in which there are no active CBSDs, and further including 4 sets of information corresponding to the 4 closest active CBSD, said four sets of information being retrieved from geolocation database 103. In some embodiments code=null indicates that the there are no currently active CBSDs which can provide coverage at the location of the UE and there are no currently inactive CBSDs, which could potentially provide coverage at the location of the UE if its state changes from inactive to active, at the location of the UE; and code=0 indicates that there are no active CBSDs providing coverage at the location of the UE, but there is at least one currently inactive CBSD which could provide coverage at the location of the UE if its state changes from inactive to active. In step 929, the user device 901 receives the response 927 and updates its GLL based on the information included in the response 927.

After a defined time interval 930, the UE 901, in step 916' user device 901 generates and sends another request signal 918', e.g., request message, to geolocation server 102 requesting active CBSDs for a specific coverage area, said request including current coordinates of user device 901, e.g., current longitude and current longitude. The process continues, e.g., geolocation server 102 receives request 918' processes the request, accesses its database 103, generates another response message and sends the response message to the UE, which again updates its GLL based on information included in the response.

FIG. 9 will again be described, with the description giving a more general overview of the exemplary method. In various embodiments, the user device 901 queries its GLL every time interval based on Exit Time when exiting the coverage area. If the user device's GLL does not contain a location matching the coverage area, the user device 901 will send a query, e.g., request message 918, to the geolocation server 102. In some embodiments, the query includes a small packet including the existing (current) longitude and latitude of the user device 900. In some embodiments, the packet further includes a value of radius distance. The geolocation server 102 receives the query, e.g., message 918, and searches the stored data, e.g., in geolocation database 103, for active CBSDs within the coverage area provided in the query or providing coverage at the current location of the user device.

If the geolocation server 102 determines there is at least one active CBSD which can provide coverage to the UE 901, then the geolocation server 102 generates and sends response message 926 including a code value 1 indicating an active CBSD exists which can provide coverage at the location of the UE, and further includes a set of information corresponding to the identified active CBSD closest to the location of the UE 901. The UE 901 receives the response message 926 and updates its GLL based on the information included in the response message, e.g., adding one new entry into its GLL.

If the geolocation server 102 determines there are not any active CBSD which can provide coverage to the UE 901, then the geolocation server 102 generates and sends response message 927 including either: (i) a code value=0 indicating a CBSD exists, which could have provided coverage at the location of the UE if active, but it is currently inactive so it cannot provide coverage the resent time, or (ii) a code value=null indicating that there are not any CBSDs (including currently active and currently inactive CBSDs) with a coverage area corresponding to the location of the UE 901. Response message 927 further includes 4 set of information corresponding to 4 identified currently active CBSDs closest to the location of the UE 901 (but outside the current area of interest). The UE 901 receives the response message 927 and updates its GLL based on the information included in the response message, e.g., adding four new entries into its GLL.

Figure 10:
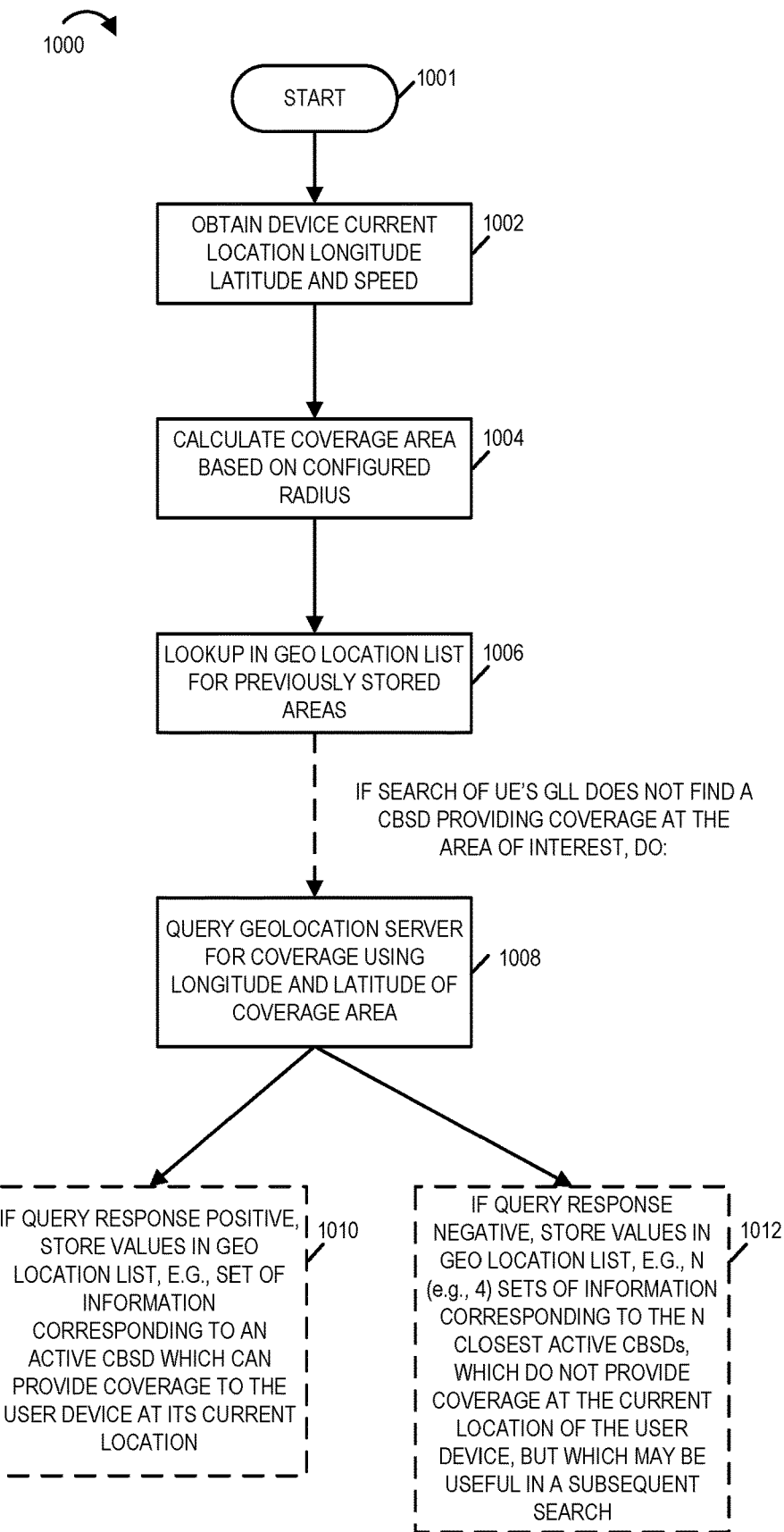
FIG. 10 is a flowchart illustrating exemplary steps performed by a user device, e.g., a UE device such as a mobile end user device (EUD) supporting Citizens Band Radio Services (CBRS) communications, in accordance with an exemplary embodiment.

FIG. 10 is a flowchart 1000 illustrating exemplary steps performed by a user device, e.g., user device 124, user device 126, a user device implementing steps of flowchart 200, user device 300, user device 602, a user device implementing steps of flowchart 800 or a user device 901, in accordance with an exemplary embodiment. Operation starts in step 1001, in which the user device is powered on and initialized and proceeds to step 1002. In step 1002 the user device obtains current location, e.g., its current longitude and latitude coordinates, and speed, e.g., based on received GPS signals, e.g., an embedded GPS receiver in the user device determines the UE's current position and velocity. Operation proceeds from step 1002 to step 1004.

In step 1004 the user device calculates a coverage area based on a configured radius. Operation proceeds from step 1004 to step 1006. In step 1006 the user device performs a look-up in its geolocation list (GLL) for previously stored areas. Operation proceeds from step 1006 to step 1008, if the search of the GLL does not find an active CBSD providing coverage at the area of interest. In step 1008 the user device queries the geolocation server, e.g. geolocation server 102, for coverage using latitude and longitude of the coverage area, e.g., the user device sends the geolocation server a request to identify an active CBSD, e.g., the closest active CBSD, which can provide coverage at the current location of the user device or to identify a set of active CBSDs which are outside the current area of interest but which are closest to the user device. Operation proceeds from step 1008 to step 1010. In step 1010 if the query response is positive, the user device stores a received set of information corresponding to an active CBSD which can provide coverage at the current location of the user device in its GLL. Alternatively if the query is negative, in step 1012 the UE stores a plurality of sets of information, e.g., 4 sets, each set of information corresponding to an active CBSD which may be able to provide coverage to the user device at a future time.

Various aspects and/or features related to the importance of SAS Geolocation will now be described. Regulation indicate that SAS should maintain a list of all CBSDs with their locations, spectrum band used, transmit power and status whether active or offline. Using the SAS for maintain location of available services provides one, more or all of the following advantages:

i) the SAS stores the following valuable CBSD data in its database: latitude, longitude, height, height type, horizontal accuracy, vertical accuracy, indoor deployment, antenna azimuth, antenna down tilt, antenna gain, EIRP capability, antenna beam width, and antenna mode;

ii) the SAS collects information directly from CBSDs without human intervention;

iii) the CBSD provides information to the SAS including up-to-date changes.

iv) The SAS system regulations provide security between SAS and the CBSD. Security between the SAS and the geolocation server can be agreed upon between operator and SAS provider.

v) The SAS is aware of each of the operator's CBSDs and their location, including CBSD belonging to a group.

vi) When CBSDs are out of service or their transmissions are powered down, the SAS will maintain the updated data.

Various aspects related to why geolocation with SAS is needed will now be described. Location is needed for a UE to know which network or operator to use and when. The UE can utilize the location information to implement policies configured by the operator. The SAS will provide accurate live location information for each of the CBSDs using the CBRS spectrum. The data provided by the SAS are current regarding the status of the CBSD including activity and emitting status. The SAS will provide updated information for each of the turned off or disabled CBSDs when the SAS request that it protect incumbent. The SAS is a centralized database of CBSDs that can be used by providers to maintain a current database that can be shared with partners including roaming partners.

In various embodiments, information included in an SAS database, e.g., sets of CBSD information corresponding to CBSDs of interest, are propagated out, e.g., via a geolocation server, to a user equipment device to be stored in the user device's GLL. Different user devices may receive and store different sets of CBSD information, e.g., depending upon which area the user device frequents.

Figure 11:
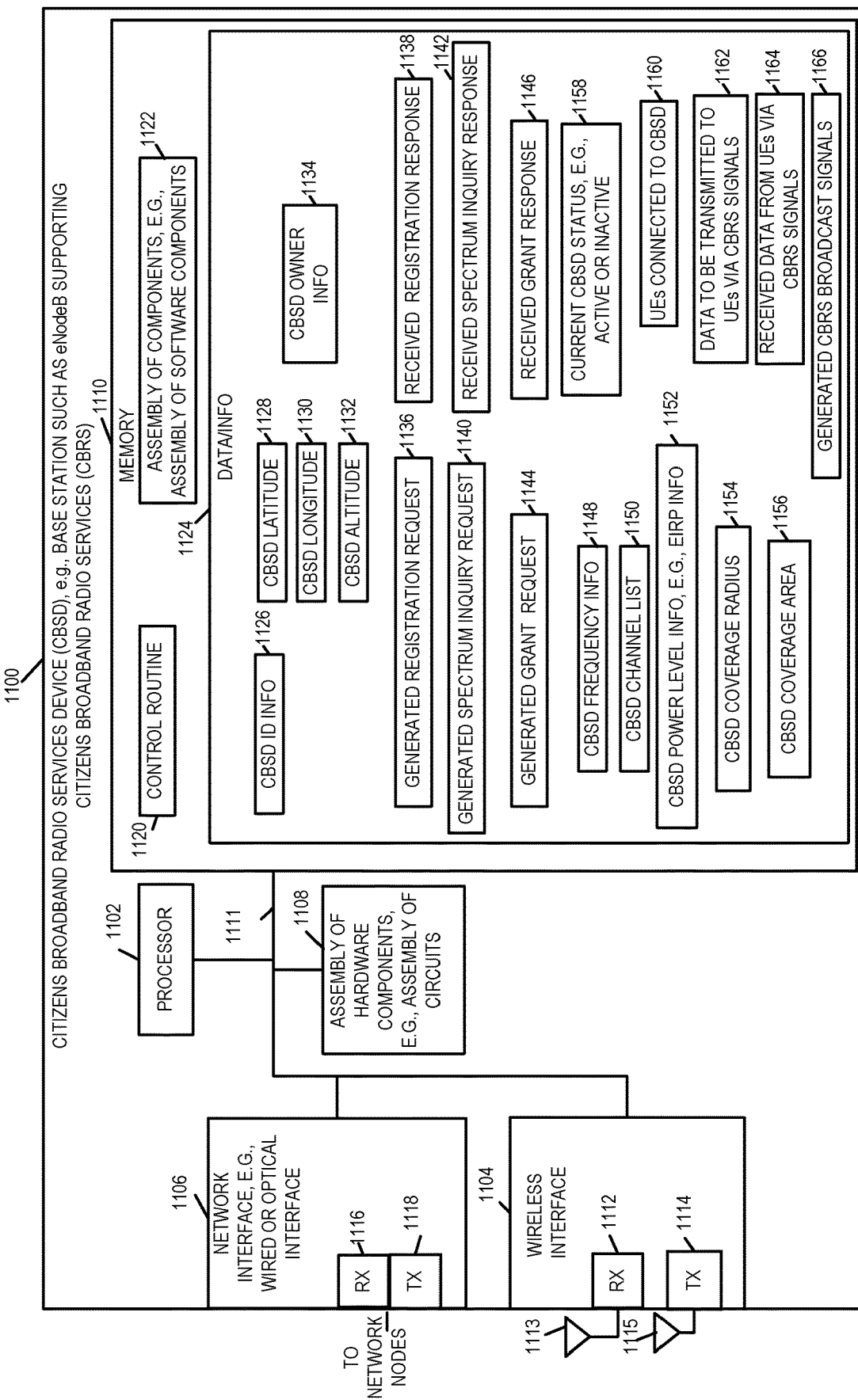
FIG. 11 is a drawing of an exemplary Citizens Broadband radio Services Device (CBSD), e.g., a base station such an eNodeB (eNB) supporting Citizens Broadband Radio Services (CBRS), in accordance with an exemplary embodiment.

FIG. 11 is a drawing of an exemplary Citizens Broadband radio Services Device (CBSD) 1100, e.g., a base station such an eNodeB (eNB) supporting Citizens Broadband Radio Services (CBRS), in accordance with an exemplary embodiment. CBSD 1100 is, e.g., one of CBSDs (108, 110, 112, 114, 116, 118, . . . , 120) of system 100 of FIG. 1, a CBSD implementing steps in flowchart 200 of FIG. 2, or CBSD 502 of FIG. 5. CBSD 1100 includes a processor 1102, e.g., a CPU, a wireless interface 1104, a network interface 1106, an assembly of hardware components 1108, e.g., an assembly of circuits, and a memory 1110 coupled together via bus 1111 over which the various elements interchange data and information with one another. Wireless interface 1104 includes a wireless receiver 1112 and a wireless transmitter 1114. Wireless receiver 1112 is coupled to receive antenna 1113 via which the CBSD 1100 receives wireless signals, e.g., CBRS wireless signals from UEs supporting CBRS communications. Wireless transmitter 1114 is coupled to transmit antenna 1115 via which the CBSD 1100 transmits wireless signals, e.g., CBRS wireless signals to UEs supporting CBRS communications.

Network interface 1106 includes a network receiver 1116 and a network transmitter 1118 coupled to network nodes, a backhaul network and/or the Internet. Exemplary signals sent via transmitter 1118 include a registration request sent to a SAS, a spectrum inquiry request sent to a SAS, and a grant request sent to a SAS. Exemplary signals received via receiver 1116 include a registration response from a SAS, a spectrum inquiry response from a SAS, and a grant response from a SAS.

Memory 1110 includes a control routine 1120, an assembly of components 1122, e.g., an assembly of software components, and data/information 1124. Data/information 1124 includes CBSD ID information 1126, e.g., a unique system-wide identifier for CBSD 1100, CBSD latitude information 1128, e.g., the latitude coordinates of the location of CBSD 1100, CBSD longitude information 1130, e.g., the latitude coordinates of the location of CBSD 1100, CBSD altitude information 1132, e.g., the altitude of CBSD 1100 above ground level, and CBSD owner information 1134, e.g., the name or ID of the CBSD 1100 operator. Data/information 1124 further includes a generated registration request 1136 to be sent to a SAS, a received registration response 1138 from the SAS, a generated spectrum inquiry request 1140 to be sent to a SAS, a received spectrum inquiry response 1142 from the SAS, a generated grant request 1144 to be sent to a SAS, a received grant response 1146 from the SAS, CBSD frequency information 1148, CBSD channel information 1150, CBSD power level information 1152, e.g., EIRP power information, a CBSD coverage radius 1154, and a CBSD coverage area 1156, e.g., based on the position of CBSD and the CBSD coverage radius. Data/information 1124 further includes current status information 1134 for the CBSD 1100, e.g., active or inactive, a list of UEs and corresponding information 1160 for each of the UEs connected to the CBSD 1100, data to be transmitted to UEs via CBRS signals 1162, received data from UEs via received CBRS signals 1164, and CBRS broadcast signals 1166.

Figure 12:
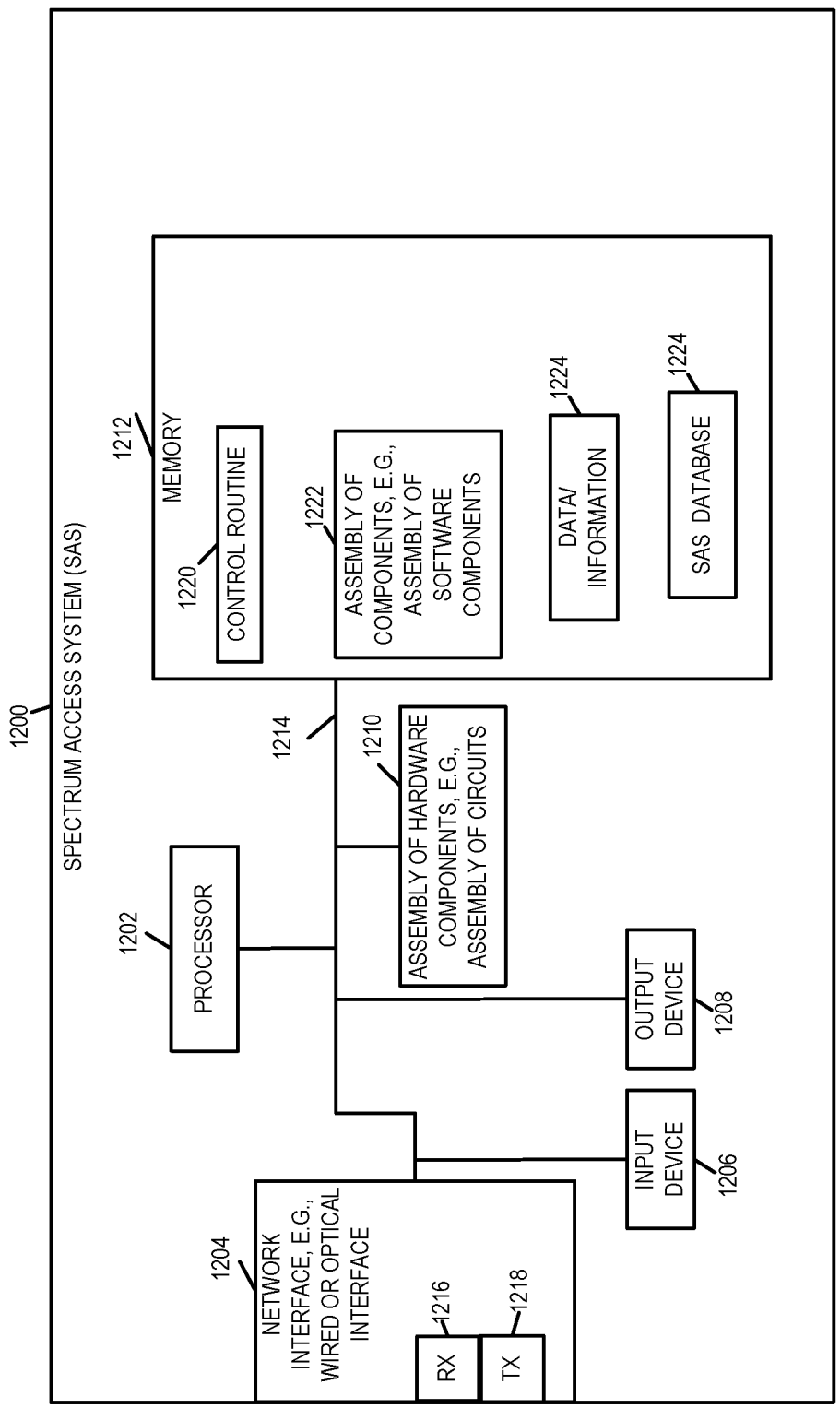
FIG. 12 is a drawing of an exemplary Spectrum Access System (SAS) in accordance with an exemplary embodiment.

FIG. 12 is a drawing of an exemplary Spectrum Access System (SAS) 1200 in accordance with an exemplary embodiment. SAS 1200 is, e.g., SAS 104 of FIGS. 1, 5, and 9. SAS 1200 includes a processor 1202, e.g., a CPU, a network interface 1204, e.g., a wired or optical interface, an input device 1206, e.g., a keyboard, an output device 1208, e.g., a display, an assembly of hardware components 1210, e.g., an assembly of circuits, and memory 1212 coupled together via a bus 1214 over which the various elements interchange data and information.

Network interface 1204 includes a receiver 1216 and a transmitter 1218. Exemplary signals received via receiver 1216 include a registration request from a CBSD, a spectrum inquiry request from a CBSD, a grant request from a CBSD, and a request for active CBSDs for a user registration ID from a geolocation server, and a request for active CBSDs for specific PLMNs from a geolocation server. Exemplary signals transmitted by transmitter 1218 includes a registration response being sent to a CBSD, a spectrum inquiry response being sent to a CBSD, a grant response being sent to a CBSD, a list of attributes for active CBSDs belonging to a user registration ID being sent to a geolocation server, and a list of attributes for active CBSDs broadcasting required PLMNs.

Memory 1212 includes a control routine 1220, an assembly of components 1222, e.g., an assembly of software components, data/information 1224, and a SAS database 1226. In some embodiments, SAS database 1226 is SAS database 105 of FIGS. 5 and 9.

Figure 13:
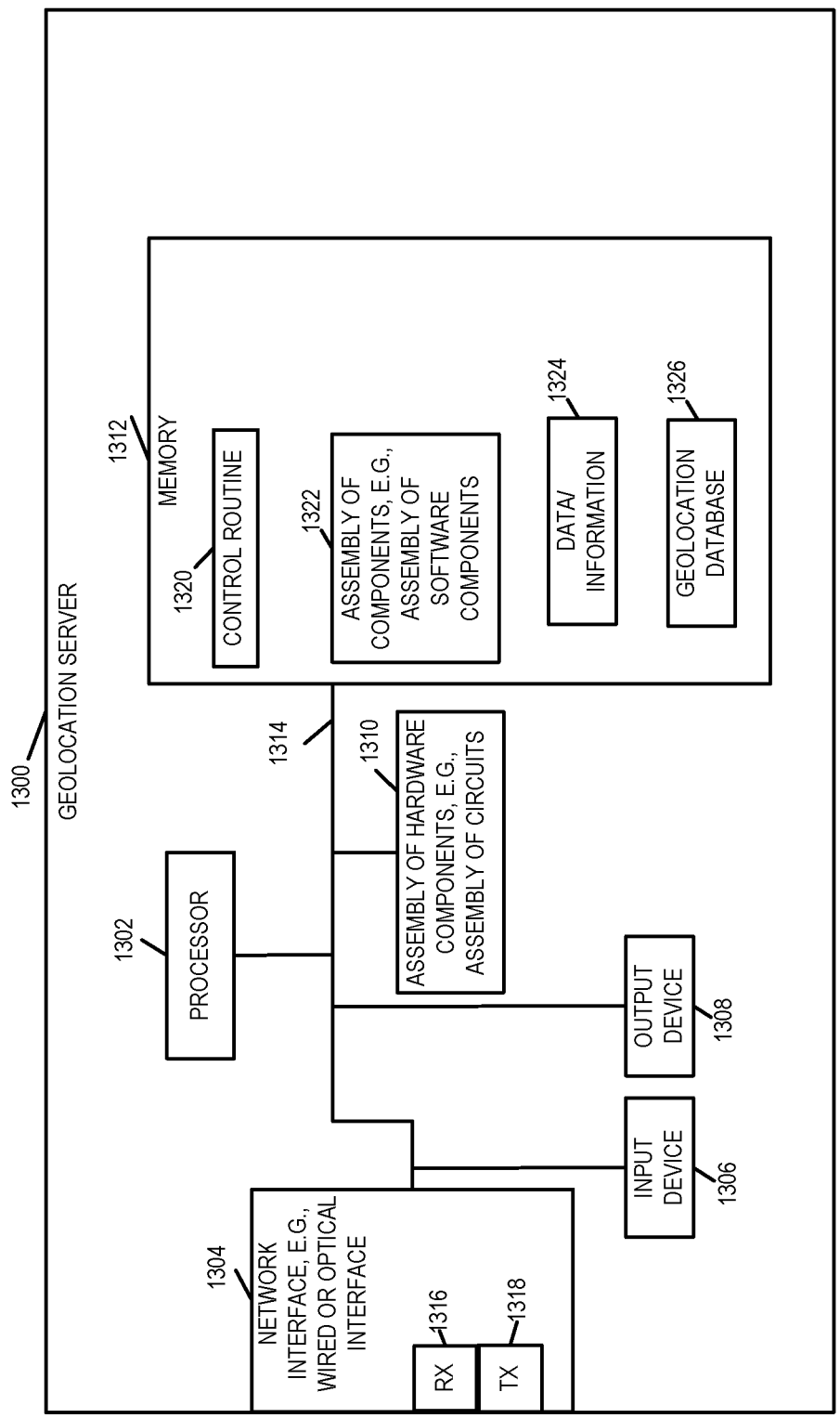
FIG. 13 is a drawing of an exemplary geolocation Server in accordance with an exemplary embodiment.

FIG. 13 is a drawing of an exemplary Geolocation Server 1300 in accordance with an exemplary embodiment. Exemplary geolocation server 1300 is, e.g., one of geolocation servers (geolocation server 1 102 of FIG. 1, . . . , geolocation server m 107 of FIG. 1, or geolocation server 502 of FIGS. 5 and 9). Geolocation server 1300 includes a processor 1302, e.g., a CPU, a network interface 1304, e.g., a wired or optical interface, an input device 1306, e.g., a keyboard, an output device 1308, e.g., a display, an assembly of hardware components 1310, e.g., an assembly of circuits, and memory 1312 coupled together via a bus 1314 over which the various elements interchange data and information.

Network interface 1304 includes a receiver 1316 and a transmitter 1318. Exemplary signals transmitted by transmitter 1318 include a request for active CBSDs for a user registration ID being sent to a SAS, a request for active CBSDs for specific PLMNs being sent to a SAS, a response including a code indicating coverage area contains active CBSDs and a set of information corresponding to the closest active CBSD being sent to a UE, and a response including a code indicating coverage area does not contain an active CBSD and four sets of information corresponding to the 4 closest active CBSD, said response being sent to a UE. Exemplary signals received via receiver 1316 include a list of attributes for active CBSDs belonging to a user registration ID, which was sent from a SAS, a list of attributes for active CBSDs broadcasting required PLMNs, which was sent from a SAS, and a request for active CBSDs for a specific coverage area which was sent from a UE, e.g., via a cellular base station such as cellular BS 106.

Memory 1312 includes a control routine 1320, an assembly of components 1322, e.g., an assembly of software components, data/information 1324, and a geolocation database 1326. In some embodiments, geolocation database 1326 is geolocation database 103 of FIGS. 5 and 9.

Figure 14A:
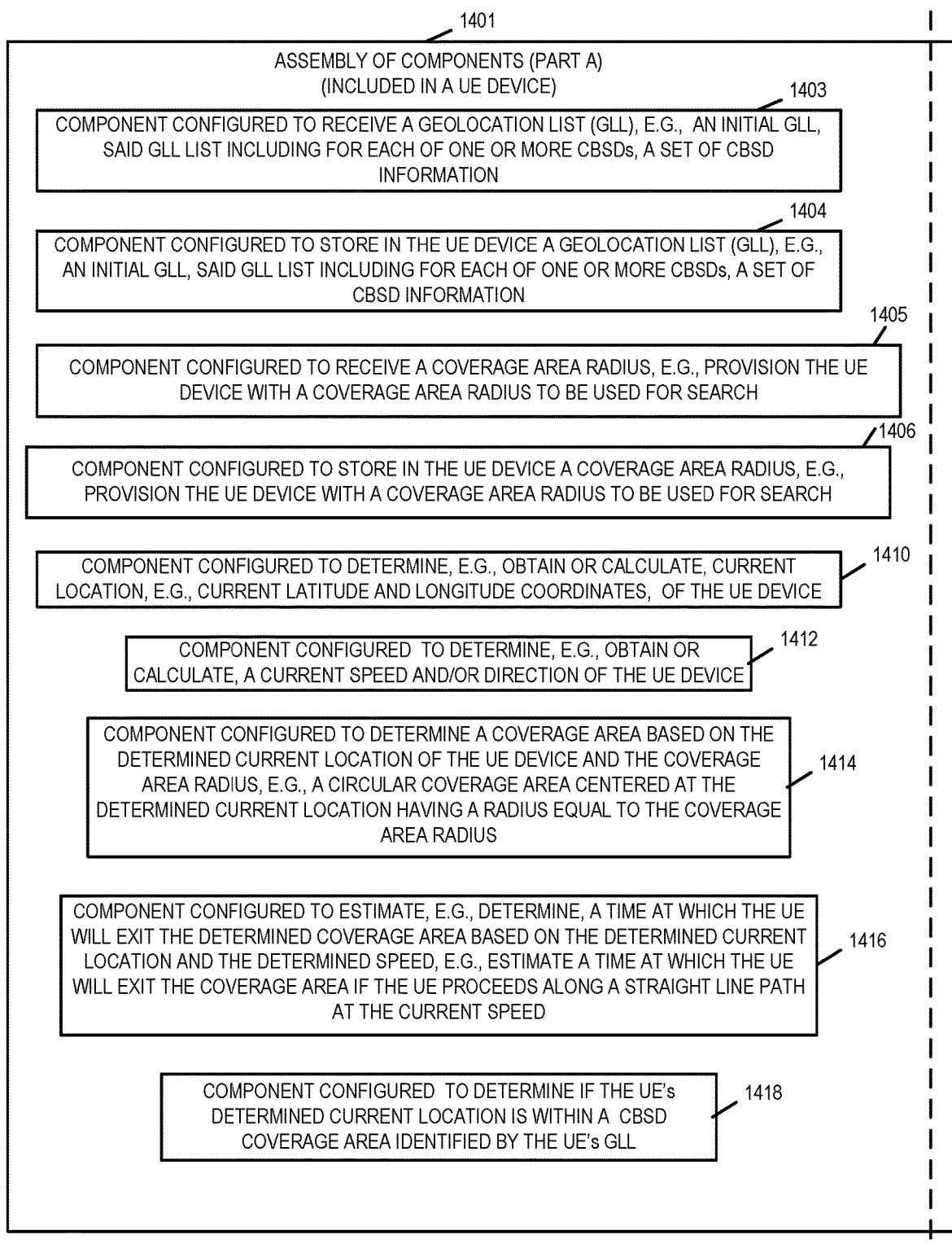
FIG. 14A is a first part of a drawing of an exemplary assembly of components which may be included in a user equipment (UE) device in accordance with an exemplary embodiment.
Figure 14B:
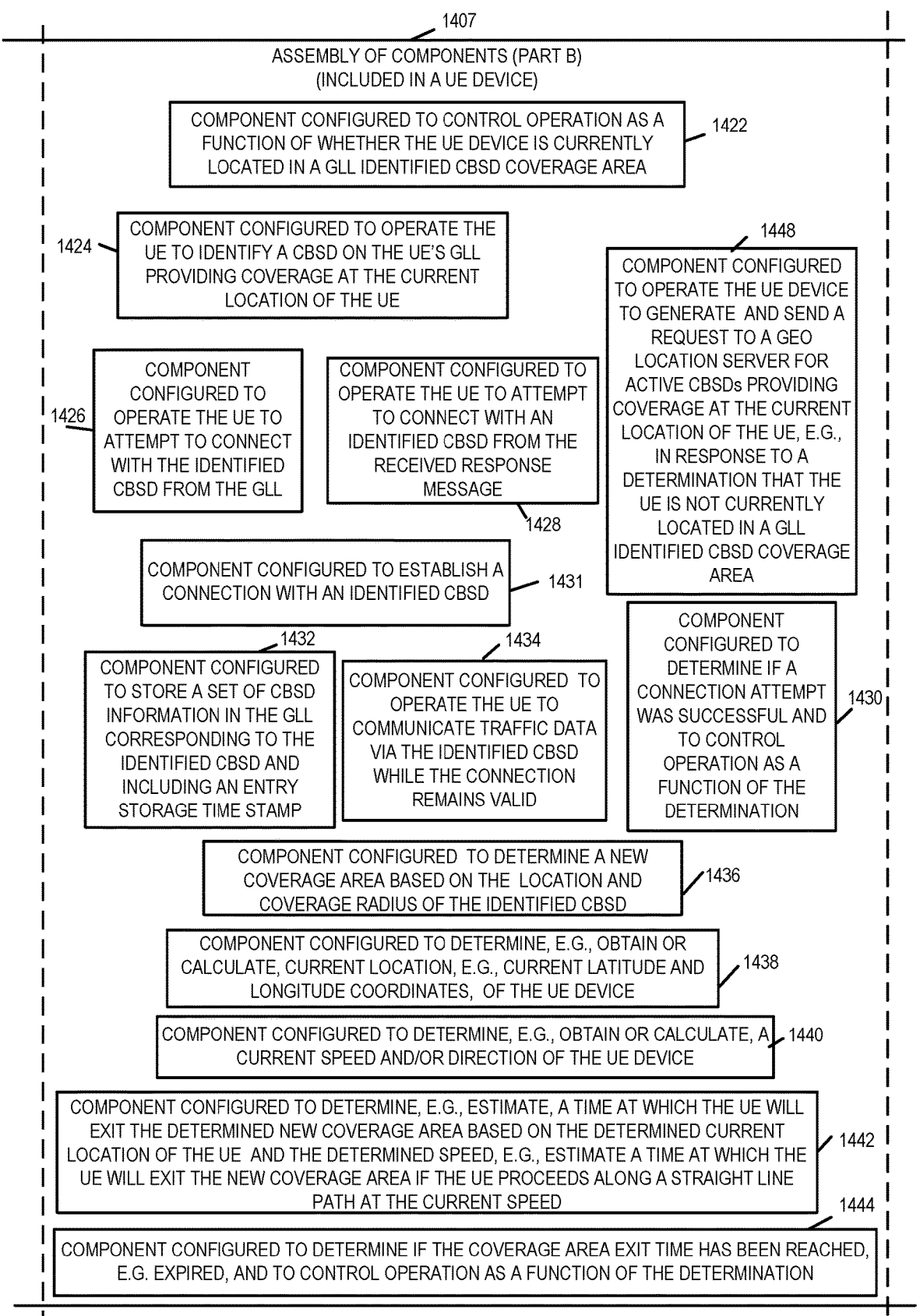
FIG. 14B is a second part of a drawing of an exemplary assembly of components which may be included in a user equipment (UE) device in accordance with an exemplary embodiment.
Figures 14, 14C:
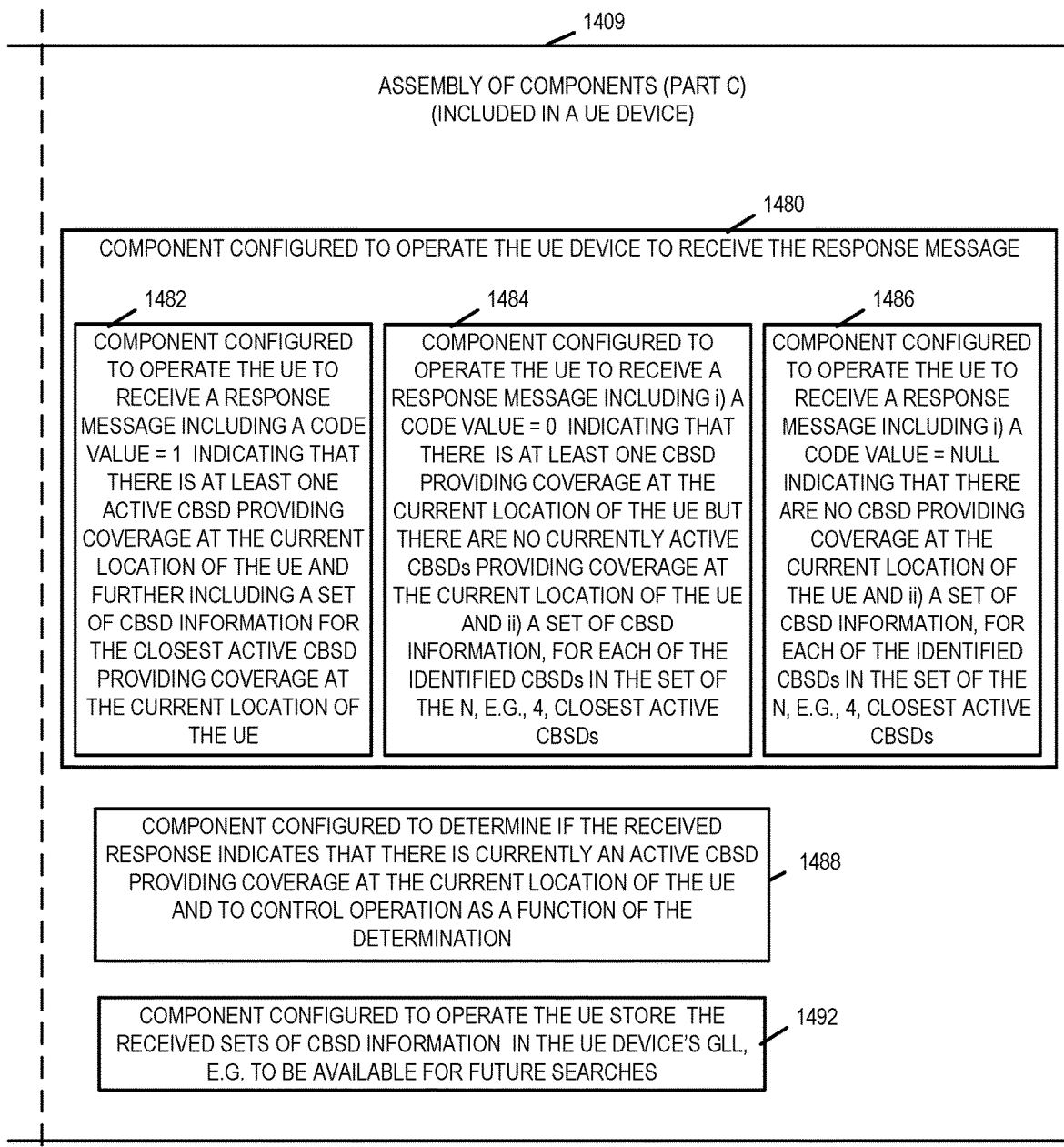
FIG. 14C is a third part of a drawing of an exemplary assembly of components which may be included in a user equipment (UE) device in accordance with an exemplary embodiment.
FIG. 14 comprises the combination of FIG. 14A, FIG. 14B and FIG. 14C.

FIG. 14, comprising the combination of FIG. 14A, FIG. 14B and FIG. 14C, is a drawing of an exemplary assembly of components 1400, comprising Part A 1401, Part B 1407 and Part C 1409, which may be included in an exemplary user equipment (UE) device implemented in accordance with an exemplary embodiment. Exemplary assembly of components 1400 is, e.g., included in UE 300 of FIG. 3, UE 1 124 of FIG. 1, UE 2 126 of FIG. 1, the UE implementing steps of flowchart 200 of FIG. 2, UE 602 of FIGS. 6 and 7, a UE implementing the steps of flowchart 800 of FIG. 8, user device 901 of FIG. 9, and/or a user device implementing the steps of flowchart 1000 of FIG. 10.

The components in the assembly of components 1400 can, and in some embodiments are, implemented fully in hardware within the processor 302, e.g., as individual circuits. The components in the assembly of components 1400 can, and in some embodiments are, implemented fully in hardware within the assembly of components 308, e.g., as individual circuits corresponding to the different components. In other embodiments some of the components are implemented, e.g., as circuits, within the processor 302 with other components being implemented, e.g., as circuits within assembly of components 308, external to and coupled to the processor 302. As should be appreciated the level of integration of components on the processor and/or with some components being external to the processor may be one of design choice. Alternatively, rather than being implemented as circuits, all or some of the components may be implemented in software and stored in the memory 312 of the UE device 300 with the components controlling operation of the UE device to implement the functions corresponding to the components when the components are executed by a processor, e.g., processor 302. In some such embodiments, the assembly of components 1400 is included in the memory 312 as assembly of components 340. In still other embodiments, various components in assembly of components 1400 are implemented as a combination of hardware and software, e.g., with another circuit external to the processor 302 providing input to the processor 302 which then under software control operates to perform a portion of a component's function. While processor 302 is shown in the FIG. 3 embodiment as a single processor, e.g., computer, it should be appreciated that the processor 302 may be implemented as one or more processors, e.g., computers.

When implemented in software the components include code, which when executed by the processor 302, configure the processor 302 to implement the function corresponding to the component. In embodiments where the assembly of components 1400 is stored in the memory 312, the memory 312 is a computer program product comprising a computer readable medium comprising code, e.g., individual code for each component, for causing at least one computer, e.g., processor 302, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 14 control and/or configure the UE device 300, or elements therein such as the processor 302, to perform the functions of corresponding steps illustrated and/or described in the method of one or more of the flowcharts, signaling diagrams and/or described with respect to any of the Figures. Thus the assembly of components 300 includes various components that perform functions of corresponding one or more described and/or illustrated steps of an exemplary method, e.g., steps of the method of flowchart 2000 of FIG. 2 and/or described or shown with respect to any of the other figures.

Assembly of components 1400 includes a component 1403 configured to receive a geolocation list (GLL), e.g., an initial GLL, said GLL including for each of one or more CBSDs, a set of CBSD information, a component 1404 configured to store in the UE the received GLL, e.g., the received initial GLL, a component 1405 configured to receive a coverage area radius, e.g., a provisioned coverage area radius to be used for search, a component 1406 configured to store in the UE device the received coverage area radius, e.g., the received provision value for the coverage area radius to be used for search, a component 1410 configured to determine, e.g., obtain or calculate, current location, e.g., current latitude and longitude coordinates of the UE device, a component 1412 configured to determine, e.g., obtain or calculate, a current speed and/or direction of the UE device, a component 1414 configured to determine a coverage area based on the determined current location and the coverage area radius, e.g., a circular coverage area centered at the determined current location of the having a radius equal to the coverage area radius, a component 1416 configured to estimate, e.g., determine, a time at which the UE will exit the determined coverage area based on the determined current location and the determined speed, e.g., estimate a time at which the UE will exit the coverage area if the UE proceeds along a straight line path at the current speed, and a component 1418 configured to determine if the UE's determined current location is within a CBSD coverage area identified by the UE's geolocation list (GLL).

Assembly of components 1400 further includes a component 1422 configure to control operation as a function of whether or not the UE is currently located in a GLL identified CBSD coverage area, a component 1424 configured to operate the UE to identify a CBSD on the UE's GLL providing coverage at the current location of the UE, a component 1426 configured to operate the UE to attempt to connect with the identified CBSD from the GLL, a component 1448 configured to operate the UE device to generate and send a request to a geolocation server for active CBSDs providing coverage at the current location of the UE, e.g., in response to a determination that UE is not currently located in a GLL identified CBSD coverage area, a component 1428 configured to operate the UE to attempt to connect with an identified CBSD from a received response message, e.g., from a geolocation server, said received response message identifying an active CBSD which should be able to provide coverage to the UE device, a component 1430 configured to determine if a connection attempt was successful and to control operation as a function of the determination, and a component 1431 configured to establish a connection with an identified CBSD, e.g. either from the GLL or from a received response message from a geolocation server.

Assembly of components 1400 further includes a component 1432 configured to store a set of CBSD information in the GLL corresponding to the identified CBSD and including an entry storage time stamp, a component 1434 configured to operate the UE to communicate traffic data via the identified CBSD while the connection remains valid, a component 1436 configured to determine a new coverage area based on the location and coverage radius of the identified CBSD, a component configured to determine, e.g., obtain or calculate, current location, e.g., current latitude and longitude coordinates, of the UE device, a component 1440 configured to determine, e.g. obtain or calculate, a current speed and/or direction of the UE device, a component 1443 configured to determine, e.g., estimate, a time a time at which the UE will exit the determined new coverage area based on the determined current location of the UE and the determined speed of the UE, e.g., estimate a time at which UE will exit the new coverage area if the UE proceeds along a straight line path at the current speed, and a component 1444 configured to determine if the coverage area exit time has been reached, e.g., expired, and to control operation as a function of the determination.

Assembly of components 1400 further includes a component 1480 configured to operate the UE device to receive the response message, e.g. from a geolocation server. Component 1480 includes a component 1492 configured to operate the UE to receive a response message including a code value=1 indicating that there is at least one active CBSD providing coverage at the current location of the UE and further including a set of CBSD information for the closest active CBSD providing coverage at the current location of the UE, a component 1484 configured to operate the UE to receive a response message including i) a code value=0 indicating that there is at least one CBSD providing coverage at the current location of the UE but there are no currently active CBSDs providing coverage at the current location of the UE and ii) a set of CBSD information for each of the identified CBSDs in the set of N, e.g. set of 4, closest active CBSDs, and a component 1486 configured to operate the UE to receive a response message including i) a code value=null indicating that there are no CBSD providing coverage at the current location of the UE and ii) a set of CBSD information for each of the identified CBSDs in the set of N, e.g. set of 4, closest active CBSDs. Assembly of components 1400 further includes a component 1488 configured to determine if the received response indicates that there is currently an active CBSD providing coverage at the current location of the UE and to control operation as a function of the determination and a component 1492 configured to operate the UE to store the received sets of CBSD information in the UE device's GLL, e.g., to be available for future searches.

Figure 15:
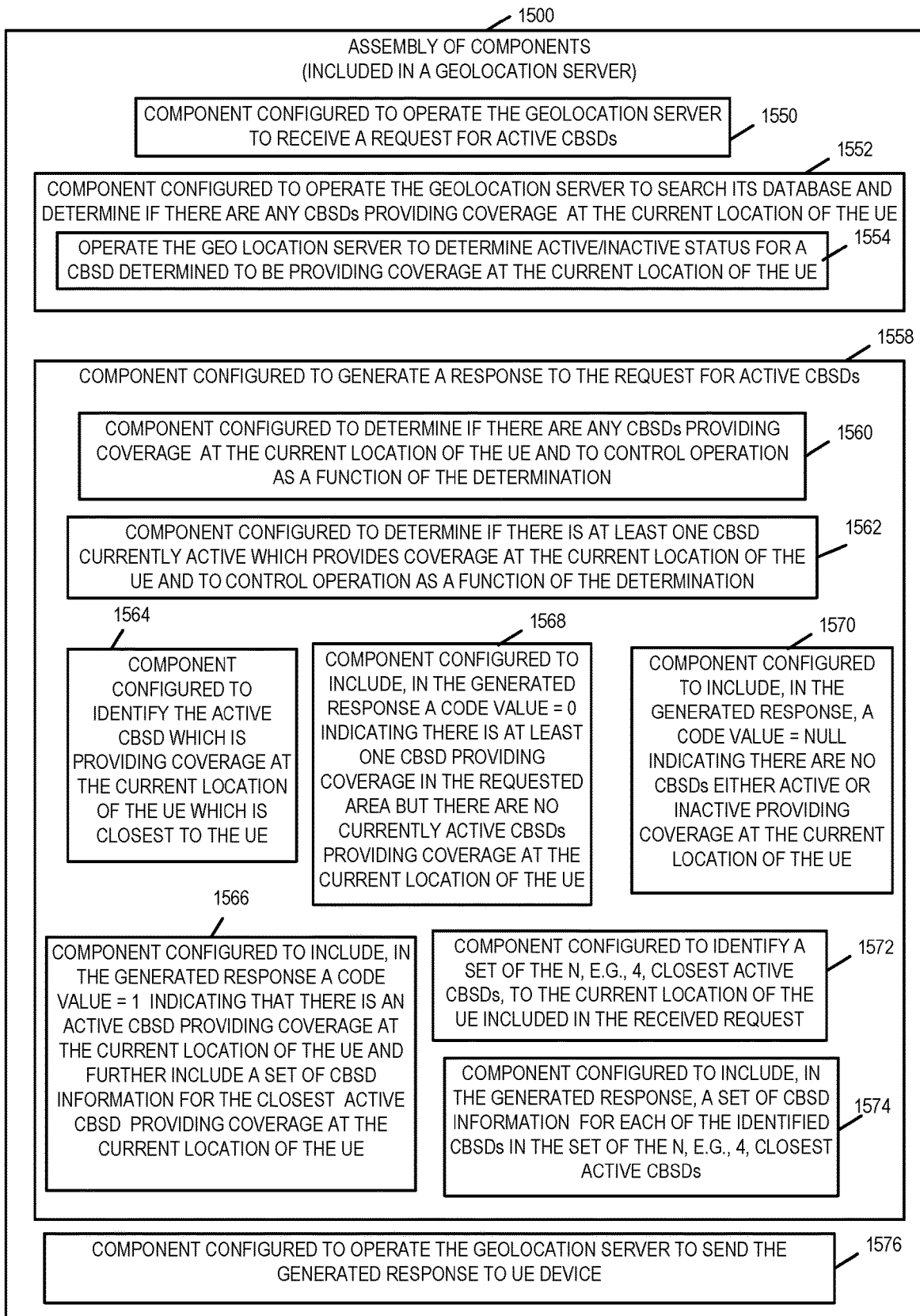
FIG. 15 is a drawing of an exemplary assembly of components which may be included in a geolocation server in accordance with an exemplary embodiment.

FIG. 15 is a drawing of an exemplary assembly of components 1500 which may be included in a geolocation server in accordance with an exemplary embodiment. The geolocation server including assembly of components 1500 is, e.g., geolocation server 1300 of FIG. 13, geolocation server 1 102 of FIG. 1, FIG. 5 or FIG. 9 or geolocation server m 107 of FIG. 1, or a geolocation server implementing steps of the method 200 of FIG. 2.

The components in the assembly of components 1500 can, and in some embodiments are, implemented fully in hardware within the processor 1302, e.g., as individual circuits. The components in the assembly of components 1500 can, and in some embodiments are, implemented fully in hardware within the assembly of components 1310, e.g., as individual circuits corresponding to the different components. In other embodiments some of the components are implemented, e.g., as circuits, within the processor 1302 with other components being implemented, e.g., as circuits within assembly of components 1310, external to and coupled to the processor 1302. As should be appreciated the level of integration of components on the processor and/or with some components being external to the processor may be one of design choice. Alternatively, rather than being implemented as circuits, all or some of the components may be implemented in software and stored in the memory 1310 of the geolocation server 1300, with the components controlling operation of the geolocation server 1300 to implement the functions corresponding to the components when the components are executed by a processor, e.g., processor 1302. In some such embodiments, the assembly of components 1500 is included in the memory 1312 as assembly of components 1322. In still other embodiments, various components in assembly of components 1500 are implemented as a combination of hardware and software, e.g., with another circuit external to the processor 1302 providing input to the processor 1302 which then under software control operates to perform a portion of a component's function. While processor 1302 is shown in the FIG. 13 embodiment as a single processor, e.g., computer, it should be appreciated that the processor 1302 may be implemented as one or more processors, e.g., computers.

When implemented in software the components include code, which when executed by the processor 1302, configure the processor 1302 to implement the function corresponding to the component. In embodiments where the assembly of components 1500 is stored in the memory 1312, the memory 1312 is a computer program product comprising a computer readable medium comprising code, e.g., individual code for each component, for causing at least one computer, e.g., processor 1302, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 15 control and/or configure the geolocation server 1300, or elements therein such as the processor 1302, to perform the functions of corresponding steps illustrated and/or described in the method of one or more of the flowcharts, signaling diagrams and/or described with respect to any of the Figures. Thus the assembly of components 1500 includes various components that perform functions of corresponding one or more described and/or illustrated steps of an exemplary method, e.g., steps of the method of flowchart 200 of FIG. 2 and/or described or shown with respect to any of the other figures.

Assembly of components 1500 includes a component 1550 configured to operate the geolocation server to receive a request for active CBSDs, a component 1552 configured to operate the geolocation server to search its database and determine if there are any CBSDs providing coverage at the current location if the UE. Component 1552 includes a component 1554 configured to operate the geolocation server to determine active/inactive status for a CBSD determined to be proving coverage at the current location of the UE. Assembly of components 1500 further includes a component 1556 configured to generate a response to the request for active CBSDs. Component 1158 includes a component 1560 configured to determine if there are any CBSDs providing coverage at the current location of the UE and to control operation as a function of the determination, a component 1562 configured to determine if there is at least one CBSD currently active which provides coverage at the current location of the UE and to control operation as a function of the determination, a component 1564 configured to identify the active CBSD which is providing coverage at the current location of the UE and which is closest to the UE, a component 1566 configured to include in the generated response a code value=1 indicating that there is an active CBSD providing coverage at the current location of the UE and further include a set of CBSD information for the closest active CBSD providing coverage at the current location of the UE, a component 1568 configured to include, in the generated response a code value=0 indicating that there is at least one CBSD providing coverage in the requested area but there are no currently active CBSDs providing coverage at the current location of the UE, a component 1570 configured to include in the generated response a code value=null indicating that there are no CBSDs either active or inactive providing coverage at the current location of the UE, a component 1572 configured to identify a set of N, e.g., a set of 4, closest active CBSDs, to the current location of the UE included in the received request, and a component 1574 configured to include, in the generated response, a set of CBSD information for each of the identified CBSDs in the set of N identified CBSDs, e.g., where N=4, closest active CBSDs to the current location of the UE. Assembly of components 1500 further includes a component 1576 configured to operate the geolocation server to send the generated response to the UE device.

Numbered List of Exemplary Method Embodiments:

Method Embodiment 1

A method of operating a user equipment (UE) device, the method comprising: storing (206), in memory included in the UE device, a coverage area search radius to be used in searching for a base station (e.g., a CBSD) which can be used by said UE to obtain wireless connectivity to a network; sending (248) a request for base station information (e.g., including current UE device location information such as GPS determined location information) to a server (e.g., a GEO location server); and receiving (280) a response message (e.g., from the GEO location server) in response to the request for base station information, said response message including a code value indicating at least whether or not there is at least one CBSD providing coverage to the current location of the UE device.

Method Embodiment 2

The method of Method Embodiment 1 wherein said request for base station information is a request for identification of one or more active base stations providing wireless coverage to the current UE device location or a location near the current UE device location.

Method Embodiment 3

The method of Method Embodiment 1, wherein said code value includes a value indicating whether or not there is at least one active base station providing coverage at the current UE device location (e.g., a 1 indicating that there is a CBSD providing coverage at the current location of the UE or a 0 indicating that there is at least one CBSD providing coverage at the current location of the UE but there are no current active CBSDs providing coverage at the current location of the UE).

Method Embodiment 4

The method of claim 1, wherein said code value (see step 286) includes a null value (e.g. 00) indicating that there are no base stations that provide coverage at the current location of the UE device.

Method Embodiment 5

The method of claim 1, wherein said response message further includes base station information for each of N closest base stations, where N is a positive integer (e.g., 4).

Method Embodiment 6

The method of Method Embodiment 5, wherein said base station information for each of the N closest base stations includes, for each of the N base stations, at least: i) a base station ID (e.g., CBSD ID) and ii) location information (CBSD coordinates) See, e.g., information in Geolocation list chart.

Method Embodiment 7

The method of Method Embodiment 6, wherein said base station information for each of the N closest base stations further includes one, more or all of i) base station coverage radius, ii) CBSD EIRP and/or iii) CBSD owner information.

Method Embodiment 8

The method of Method Embodiment 6, further comprising: storing (292) at least some of the received base station information in a geographic location list (GLL) of base station information in said memory.

Method Embodiment 9

The method of Method Embodiment 8, further comprising: identifying (224) a base station in the GLL providing coverage at the current location of the UE; and establishing a connection (231) with the identified base station.

Method Embodiment 10

The method of Method Embodiment 9, wherein said identified base station is a first base station, the method further comprising: determine (236) a coverage area corresponding to the first base station based on a location of the identified base station indicated in the GLL and a coverage area of the first base station indicated in the GLL.

Method Embodiment 11

The method of Method Embodiment 10, further comprising: determining (240) a current speed and direction of the UE device; and determining (242) an exit time at which the UE will exit the determined coverage area of the first base station to which it is connected based on i) the current location of the UE and ii) the determined speed and direction of the UE device.

Method Embodiment 12

The method of Method Embodiment 11, further comprising: determining (244) if the exit time has been reached; and determining (222), following determining that the exit time has been reached (e.g. after returning to step 222 via connecting node 246 and the steps preceding 222), if the UE device is currently located in a coverage area of a base station included in the GLL; identifying a second base station (224) in response to determining that the UE device is currently located in a coverage area of a base station included in the GLL; and establishing (231) a connection with the second base station.

Method Embodiment 13

The method of Method Embodiment 11, further comprising: determining (244) if the exit time has been reached; and determining (222), following determining that the exit time has been reached (e.g. after returning to step 222 via connecting node 246 and the steps preceding 222), that the UE device is not currently located in a coverage area of a base station included in the GLL; and sending (248) another request to the server (e.g., GEO location server) in response to determining that the UE device is not currently located in a coverage area of a base station included in the GLL.

Numbered List of Exemplary Apparatus Embodiments:

Apparatus Embodiment 1

A user equipment (UE) device (300) comprising: memory (312) storing (206) a coverage area search radius (354) to be used in searching for a base station (e.g., a CBSD) which can be used by said UE to obtain wireless connectivity to a network; a transmitter (318); a processor (302) configured to: control the transmitter (318) to send (248) a request for base station information (e.g., including current UE device location information such as GPS determined location information) to a server (e.g., a GEO location server); and a receiver (316) for receiving (280) a response message (e.g., from the GEO location server) in response to the request for base station information, said response message including a code value indicating at least whether or not there is at least one CBSD providing coverage to the current location of the UE device.

Apparatus Embodiment 2

The UE device (300) of Apparatus Embodiment 1 wherein said request for base station information is a request for identification of one or more active base stations providing wireless coverage to the current UE device location or a location near the current UE device location.

Apparatus Embodiment 3

The UE device (300) of Apparatus Embodiment 1, wherein said code value includes a value indicating whether or not there is at least one active base station providing coverage at the current UE device location (e.g., a 1 indicating that there is a CBSD providing coverage at the current location of the UE or a 0 indicating that there is at least one CBSD providing coverage at the current location of the UE but there are no current active CBSDs providing coverage at the current location of the UE).

Apparatus Embodiment 4

The UE device (300) of Apparatus Embodiment 1, wherein said code value (see step 286) includes a null value (e.g. 00) indicating that there are no base stations that provide coverage at the current location of the UE device.

Apparatus Embodiment 5

The UE device (300) of Apparatus Embodiment 1, wherein said response message further includes base station information for each of N closest base stations, where N is a positive integer (e.g., 4).

Apparatus Embodiment 6

The UE device (300) of Apparatus Embodiment 5, wherein said base station information for each of the N closest base stations includes, for each of the N base stations, at i) a base station ID (e.g., CBSD ID) and/or ii) location information (CBSD coordinates). (see information in Geolocation list chart)

Apparatus Embodiment 7

The UE device (300) of Apparatus Embodiment 6, wherein said base station information for each of the N closest base stations further includes base station coverage radius and one or both of: i) CBSD EIRP and ii) CBSD owner information.

Apparatus Embodiment 8

The UE device (300) of Apparatus Embodiment 6, wherein the processor (320) is further configured to control the UE device (300) to: store, in memory (312), at least some of the received base station information in a geographic location list (GLL) (344) of base station information in said memory.

Apparatus Embodiment 9

The UE device (300) of Apparatus Embodiment 8, wherein the processor (320) is further configured to control the UE device (300) to: identify (224) a base station in the GLL providing coverage at the current location of the UE; and establish a connection (231) with the identified base station.

Apparatus Embodiment 10

The UE device (300) of Apparatus Embodiment 9, wherein said identified base station is a first base station, the processor (302) being further configured to control the UE device (300) to: determine (236) a coverage area corresponding to the first base station based on a location of the identified base station indicated in the GLL and a coverage area of the first base station indicated in the GLL.

Apparatus Embodiment 11

The UE device (300) of Apparatus Embodiment 10, wherein the processor (302) is further configured to control the UE device (302) to: determine (240) a current speed and direction of the UE device; and determine (242) an exit time at which the UE will exit the determined coverage area of the first base station to which it is connected based on i) the current location of the UE and ii) the determined speed and direction of the UE device.

Apparatus Embodiment 12

The UE device (300) of Apparatus Embodiment 11, wherein the processor (302) is further configured to control the UE device (300) to: determine (244) if the exit time has been reached; and determine (222), following determining that the exit time has been reached (e.g. after returning to step 222 via connecting node 246 and the steps preceding 222), if the UE device is currently located in a coverage area of a base station included in the GLL; identify (224) a second base station in response to determining that the UE device is currently located in a coverage area of a base station included in the GLL; and establish (231) a connection with the second base station.

Apparatus Embodiment 13

The UE device (300) of Apparatus Embodiment 11, wherein the processor (302) is further configured to control the UE device (300) to: determine (244) if the exit time has been reached; and determine (222), following determining that the exit time has been reached (e.g. after returning to step 222 via connecting node 246 and the steps preceding 222), that the UE device is not currently located in a coverage area of a base station included in the GLL; and control the transmitter (318) to send (248) another request to the server (e.g., GEO location server) in response to determining that the UE device is not currently located in a coverage area of a base station included in the GLL.

Numbered List of Exemplary Computer Readable Medium Embodiments:

1. A non-transitory computer readable medium (312) including computer executable instructions which when executed by a processor (302) control a user equipment (UE) device (300) to perform the steps of: storing (206), in memory included in the UE device, a coverage area search radius to be used in searching for a base station (e.g., a CBSD) which can be used by said UE to obtain wireless connectivity to a network; sending (248) a request for base station information (e.g., including current UE device location information such as GPS determined location information) to a server (e.g., a GEO location server); and receiving (280) a response message (e.g., from the GEO location server) in response to the request for base station information, said response message including a code value indicating at least whether or not there is at least one CBSD providing coverage to the current location of the UE device.

The techniques of various embodiments may be implemented using software, hardware and/or a combination of software and hardware. Various embodiments are directed to apparatus, e.g., user devices such as a user equipment (UE) device such as a mobile end user device (EUD) supporting CBRS communications, base stations such as eNodeBs supporting CBRS communications serving as Citizens Broadband radio Services Devices (CBSDs), cellular base stations not servings as CBSD devices, network nodes, geolocation servers, SAS systems, SAS servers, geolocation databases, SAS databases, an AMF device, servers, customer premises equipment devices, cable systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating user devices, base stations, CBSDs, geolocation server, geolocation databases, SAS devices, SAS databases, gateways, servers, cable networks, cloud networks, nodes, servers, cloud service servers, customer premises equipment devices, controllers, network monitoring nodes/servers and/or cable or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as controllers are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a cluster controller including, with a processor which includes a component corresponding to each of the steps of the various described methods performed by the device in which the processor is included. In some but not all embodiments a device, e.g., communications node such as a controller, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device, e.g., a user device, a CBSD, a base station, a geolocation server, a SAS, or other device described in the present application. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a user equipment (UE) device, the method comprising:
    storing, in memory included in the UE device, a coverage area search radius to be used in searching for a base station which can be used by said UE device to obtain wireless connectivity to a network;
    sending a request for base station information to a server;
    receiving a response message in response to the request for base station information, said response message including a code value indicating at least whether or not there is at least one Citizens Broadband radio Services Device (CBSD) providing coverage to the current location of the UE device;
    determining a coverage area corresponding to a first base station to which the UE device is connected based on a location of the first base station indicated in a geographic location list (GLL) and a coverage area of the first base station indicated in the GLL;
    determining an exit time at which the UE device will exit the determined coverage area of the first base station to which it is connected based on i) the current location of the UE device and ii) a determined speed and direction of the UE device;
    determining that the exit time has been reached; and
    following determining that the exit time has been reached:
        i) determining, if the UE device is currently located in a coverage area of a base station included in the GLL;
        ii) identifying a second base station in response to determining that the UE device is currently located in a coverage area of a base station included in the GLL; and
        iii) establishing a connection with the second base station.

2. The method of claim 1, wherein said code value includes a value indicating whether or not there is at least one active base station providing coverage at the current UE device location.

3. The method of claim 1, wherein if said code value includes a null value, said code value indicates that there are no base stations that provide coverage at the current location of the UE device.

4. The method of claim 1, wherein said response message further includes base station information for each of N closest base stations, where N is a positive integer.

5. The method of claim 4, wherein said base station information for each of the N closest base stations includes, for each of the N base stations, at least: i) a base station ID and ii) location information.

6. The method of claim 5, wherein said base station information for each of the N closest base stations further includes: base station coverage radius and at least one of: i) CBSD Effective or Equivalent Isotropic Radiated Power (EIRP) or ii) CBSD owner information.

7. The method of claim 5, further comprising:
    prior to determining a coverage area corresponding to a first base station,
    storing at least some of the received base station information in said geographic location list (GLL) of base station information in said memory.

8. The method of claim 7, further comprising:
    prior to determining a coverage area corresponding to a first base station,
    identifying a base station in the GLL providing coverage at the current location of the UE device; and establishing a connection with the identified base station, wherein said first base station is said identified base station.

9. The method of claim 1, further comprising: determining, prior to determining said exit time, a current speed and direction of the UE device.

10. A method of operating a user equipment (UE) device, the method comprising:
storing, in memory included in the UE device, a coverage area search radius to be used in searching for a base station which can be used by said UE device to obtain wireless connectivity to a network;
sending a request for base station information to a server;
receiving a response message in response to the request for base station information, said response message including a code value indicating at least whether or not there is at least one Citizens Broadband radio Services Device (CBSD) providing coverage to the current location of the UE device;
determining a coverage area corresponding to a first base station to which the first UE device is connected based on a location of the first base station indicated in a geographic location list (GLL) and a coverage area of the first base station indicated in the GLL;
determining an exit time at which the UE device will exit the determined coverage area of the first base station to which it is connected based on i) the current location of the UE device and ii) a determined speed and direction of the UE device;
determining that the exit time has been reached; and
determining, following determining that the exit time has been reached, that the UE device is not currently located in a coverage area of a base station included in the GLL; and
sending another request to the server in response to determining that the UE device is not currently located in a coverage area of a base station included in the GLL.

11. A user equipment (UE) device comprising:
memory storing a coverage area search radius to be used in searching for a base station which can be used by said UE device to obtain wireless connectivity to a network;
a transmitter;
a processor configured to:
control the transmitter to send a request for base station information to a server; and
a receiver for receiving a response message in response to the request for base station information, said response message including a code value indicating at least whether or not there is at least one Citizens Broadband radio Services Device (CBSD) providing coverage to the current location of the UE device; and
wherein said processor is further configured to:
determine a coverage area corresponding to a first base station to which the UE device is connected based on a location of the first base station indicated in a geographic location list (GLL) and a coverage area of the first base station indicated in the GLL;
determine an exit time at which the UE device will exit the determined coverage area of the first base station to which it is connected based on i) the current location of the UE device and ii) a determined speed and direction of the UE device;
determine that the exit time has been reached; and
following determining that the exit time has been reached:
i) determine, if the UE device is currently located in a coverage area of a base station included in the GLL;
ii) identify a second base station in response to determining that the UE device is currently located in a coverage area of a base station included in the GLL; and
iii) establish a connection with the second base station.

12. The UE device of claim 11, wherein said code value includes a value indicating whether or not there is at least one active base station providing coverage at the current UE device location.

13. The UE device of claim 11, wherein if said code value includes a null value, said code value indicates that there are no base stations that provide coverage at the current location of the UE device.

14. The UE device of claim 11, wherein said response message further includes base station information for each of N closest base stations, where N is a positive integer.

15. The UE device of claim 14, wherein said base station information for each of the N closest base stations includes, for each of the N base stations, at least i) a base station ID and ii) location information.

16. The UE device of claim 15, wherein said base station information for each of the N closest base stations further includes: base station coverage radius and at least one of: i) CBSD Effective or Equivalent Isotropic Radiated Power (EIRP) or iii) CBSD owner information.

17. The UE device of claim 15, wherein the processor is further configured to control the UE device to:
store, in memory, at least some of the received base station information in said geographic location list (GLL) of base station information in said memory.

18. A non-transitory computer readable medium including computer executable instructions which when executed by a processor control a user equipment (UE) device to perform the steps of:
storing, in memory included in the UE device, a coverage area search radius to be used in searching for a base station which can be used by said UE device to obtain wireless connectivity to a network;
sending a request for base station information to a server; and
receiving a response message in response to the request for base station information, said response message including a code value indicating at least whether or not there is at least one Citizens Broadband radio Services Device (CBSD) providing coverage to the current location of the UE device;
determining a coverage area corresponding to a first base station to which the first UE device is connected based on a location of the first base station indicated in a geographic location list (GLL) and a coverage area of the first base station indicated in the GLL;
determining an exit time at which the UE device will exit the determined coverage area of the first base station to which it is connected based on i) the current location of the UE device and ii) a determined speed and direction of the UE device;
determining that the exit time has been reached; and
following determining that the exit time has been reached:
i) determining, if the UE device is currently located in a coverage area of a base station included in the GLL;

ii) identifying a second base station in response to determining that the UE device is currently located in a coverage area of a base station included in the GLL; and iii) establishing a connection with the second base station.

* * * * *